(12) United States Patent
Smith et al.

(10) Patent No.: US 9,457,538 B2
(45) Date of Patent: Oct. 4, 2016

(54) ABSORBENT NON-WOVEN FIBROUS MATS AND PROCESS FOR PREPARING SAME

(75) Inventors: Daniel J. Smith, Stow, OH (US); Horst Ring, Boblingen (DE)

(73) Assignees: The University of Akron, Akron, OH (US); SNS Nano Fiber Technology, LLC, Uniontown, OH (US)

(*) Notice: Subject to any disclaimer, the term of this patent is extended or adjusted under 35 U.S.C. 154(b) by 888 days.

(21) Appl. No.: 12/278,159

(22) PCT Filed: Feb. 2, 2007

(86) PCT No.: PCT/US2007/002884
§ 371 (c)(1),
(2), (4) Date: Oct. 27, 2008

(87) PCT Pub. No.: WO2007/092303
PCT Pub. Date: Aug. 16, 2007

(65) Prior Publication Data
US 2009/0093585 A1  Apr. 9, 2009

Related U.S. Application Data

(60) Provisional application No. 60/765,309, filed on Feb. 3, 2006.

(51) Int. Cl.
| | | |
|---|---|---|
| B32B 5/08 | (2006.01) | |
| B32B 5/26 | (2006.01) | |
| D01D 5/00 | (2006.01) | |
| D01D 5/098 | (2006.01) | |
| D01F 1/10 | (2006.01) | |
| D04H 1/44 | (2006.01) | |
| D04H 1/56 | (2006.01) | |
| B32B 5/02 | (2006.01) | |
| D04H 1/4374 | (2012.01) | |

(52) U.S. Cl.
CPC .............. *B32B 5/26* (2013.01); *B32B 5/022* (2013.01); *B32B 5/08* (2013.01); *D01D 5/0007* (2013.01); *D01D 5/0985* (2013.01); *D01F 1/10* (2013.01); *D04H 1/4374* (2013.01); *D04H 1/44* (2013.01); *D04H 1/56* (2013.01); *B32B 2250/20* (2013.01); *B32B 2255/02* (2013.01); *B32B 2255/24* (2013.01); *B32B 2255/26* (2013.01); *B32B 2262/02* (2013.01); *B32B 2262/0207* (2013.01); *B32B 2262/0215* (2013.01); *B32B 2262/0246* (2013.01); *B32B 2262/0292* (2013.01); *B32B 2262/14* (2013.01); *B32B 2307/726* (2013.01); *B32B 2307/728* (2013.01); *B32B 2535/00* (2013.01); *B32B 2555/02* (2013.01)

(58) Field of Classification Search
CPC .......... B32B 5/022; B32B 5/08; B32B 5/26; D04H 1/4374
USPC ......... 239/34, 36, 44, 57; 524/507; 604/358, 604/366, 367, 604; 442/59, 61, 62, 164, 442/361
See application file for complete search history.

(56) References Cited

U.S. PATENT DOCUMENTS

| | | | |
|---|---|---|---|
| 4,043,331 A | 8/1977 | Martin et al. | |
| 4,077,410 A * | 3/1978 | Butterworth et al. | 604/366 |
| 4,100,324 A * | 7/1978 | Anderson et al. | 442/344 |
| 4,878,908 A | 11/1989 | Martin et al. | |
| 5,164,522 A * | 11/1992 | McCarthy et al. | 554/39 |
| 5,350,624 A * | 9/1994 | Georger et al. | 428/219 |
| 5,508,102 A * | 4/1996 | Georger et al. | 442/400 |
| 6,384,254 B1 * | 5/2002 | Omura | 556/425 |
| 6,520,425 B1 | 2/2003 | Reneker et al. | |
| 6,685,956 B2 | 2/2004 | Chu et al. | |
| 6,689,374 B2 | 2/2004 | Chu et al. | |
| 6,695,992 B2 | 2/2004 | Reneker et al. | |
| 6,753,454 B1 | 6/2004 | Smith et al. | |
| 6,832,526 B2 | 12/2004 | Koyama et al. | |
| 2003/0017208 A1 * | 1/2003 | Ignatious et al. | 424/486 |
| 2003/0026985 A1 * | 2/2003 | Greiner et al. | 428/373 |
| 2003/0211069 A1 | 11/2003 | Deckner et al. | |
| 2004/0018226 A1 * | 1/2004 | Wnek et al. | 424/443 |
| 2004/0082925 A1 * | 4/2004 | Patel | 604/289 |
| 2005/0215965 A1 | 9/2005 | Schmidt et al. | |
| 2005/0266760 A1 | 12/2005 | Chhabra et al. | |
| 2006/0004336 A1 * | 1/2006 | Zhang et al. | 604/368 |
| 2006/0293214 A1 * | 12/2006 | Cheng et al. | 510/504 |

FOREIGN PATENT DOCUMENTS

| | | | | |
|---|---|---|---|---|
| EP | 0136900 | * | 4/1985 | ............ A61L 31/00 |
| EP | 1277403 | * | 1/2003 | ............ A01N 33/12 |
| WO | WO 2004/092471 A2 | | 10/2004 | |

OTHER PUBLICATIONS

Park et al. (Macromolecular Research vol. 13 No. 3 pp. 243-252 2005).*
Chatterjee et al. (Absorbent Technology, Elsevier, Amsterdam The Netherlands 2002).*
Silicon Spectator ({http://www.siliconespectatorcom/articles/Silicone_Spectator_March_2009.pdf} originally published May 2000 by Anthony O'Lenick Jr, Siltech Inc. Dacula GA 30019).*

* cited by examiner

*Primary Examiner* — Edward Cain
(74) *Attorney, Agent, or Firm* — Renner Kenner Greive Bobak Taylor & Weber

(57) ABSTRACT

The present invention relates to liquid entrapping devices (e.g., absorbent non-woven fibrous mats) and to a process for preparing such devices. More particularly, the present invention relates to mechanically strong absorbent materials made from such liquid entrapping devices (e.g., non-woven fibrous mats) and to a method for preparing same. In one embodiment, a liquid entrapping device of the present invention comprises at least one hydrophilic elastomeric fibrous component (HEFC) and at least one wetting agent component. In another embodiment, a liquid entrapping device of the present invention comprise at least one hydrophilic elastomeric fibrous component (HEFC), at least one absorbent component, and at least one wetting agent component. In one instance, the wetting agent component of the present invention is contained on and/or within the fibers and/or nanofibers that form the liquid entrapping device (e.g., a non-woven fibrous mat) of the present invention.

13 Claims, 13 Drawing Sheets

ABSORBENT NON-WOVEN FIBROUS MATS AND PROCESS FOR PREPARING SAME

FIELD OF THE INVENTION

The present invention relates to liquid entrapping devices (e.g., absorbent non-woven fibrous mats) and to a process for preparing such devices. More particularly, the present invention relates to mechanically strong absorbent materials made from such liquid entrapping devices (e.g., non-woven fibrous mats) and to a method for preparing same. In one embodiment, a liquid entrapping device of the present invention comprises at least one hydrophilic elastomeric fibrous component (HEFC) and at least one wetting agent component. In another embodiment, a liquid entrapping device of the present invention comprise at least one hydrophilic elastomeric fibrous component (HEFC), at least one absorbent component, and at least one wetting agent component. In one instance, the wetting agent component of the present invention is contained on and/or within the fibers and/or nanofibers that form the liquid entrapping device (e.g., a non-woven fibrous mat) of the present invention.

BACKGROUND OF THE INVENTION

Nanofibers and articles that contain and/or are made from nanofibers have recently attracted interest for use in a variety of consumer product fields. For example, in the field of personal care products such as diapers, tampons, and incontinence pads include therein one or more fibrous mats that are designed to absorb one or more liquids (e.g., blood, urine, etc.). It is known in the art to form such fibrous mats from fibers and/or nanofibers.

A variety of methods known in the art can be used to produce nanofibers suitable for use in non-woven fibrous mats. Such techniques include melt-blowing, nanofibers-by-gas-jet (NGJ), and electrospinning. In a melt-blowing process, a stream of molten polymer or other fiber-forming material is typically extruded into a jet of gas to form fibers. The resulting fibers are typically greater than 1,000 nanometers in diameter, and more typically, greater than 10,000 nanometers in diameter.

The electrospinning of liquids and/or solutions capable of forming fibers, also known within the fiber forming industry as electrostatic spinning, is well known and has been described in a number of patents as well as in the general literature. The process of electrospinning generally involves the creation of an electrical field at the surface of a liquid. The resulting electrical forces create a jet of liquid that carries an electrical charge. Thus, the liquid jets may be attracted to other electrically charged objects at a suitable electrical potential. As the jet of liquid elongates and travels, the fiber-forming material within the liquid jet will dry and harden. The hardening and drying of the elongated jet of liquid may be caused by cooling of the liquid (i.e., where the liquid is normally a solid at room temperature), evaporation of a solvent (e.g., by dehydration), physically induced hardening, or by a curing mechanism (i.e., chemically induced hardening). The resulting charged fibers are collected on a suitably located, oppositely charged receiver and subsequently removed from it as needed, or directly applied to an oppositely charged or grounded generalized target area. Such fibers can be formed in non-woven fibrous mats, webs or other structures and incorporated, as desired, into a wide range of products.

In some applications, especially those related to personal care products such as diapers, tampons and/or incontinence pads, it is highly desirable to design fibrous mats, webs and/or structures that absorb one or more liquids rapidly, are comfortable to the wearer and are hypoallergenic.

Thus, there is a need in the art for fibrous mats, webs and/or other structures that possess, among other things, improved water absorbing properties and can be used in applications where one or more liquids need to be absorbed rapidly.

SUMMARY OF THE INVENTION

The present invention relates to liquid entrapping devices (e.g., absorbent non-woven fibrous mats) and to a process for preparing such devices. More particularly, the present invention relates to mechanically strong absorbent materials made from such liquid entrapping devices (e.g., non-woven fibrous mats) and to a method for preparing same. In one embodiment, a liquid entrapping device of the present invention comprises at least one hydrophilic elastomeric fibrous component (HEFC) and at least one wetting agent component. In another embodiment, a liquid entrapping device of the present invention comprise at least one hydrophilic elastomeric fibrous component (HEFC), at least one absorbent component, and at least one wetting agent component. In one instance, the wetting agent component of the present invention is contained on and/or within the fibers and/or nanofibers that form the liquid entrapping device (e.g., a non-woven fibrous mat) of the present invention.

In one embodiment, the present invention relates to a liquid entrapping device comprising: at least one hydrophilic elastomeric fibrous component; at least one absorbent component; and at least one wetting agent component, wherein the absorbent component and the at least one hydrophilic elastomeric fibrous component are in physical proximity resulting in fluid communication, and wherein the absorbent component is more absorbent than the at least one hydrophilic elastomeric fibrous component.

In another embodiment, the present invention relates to a process for making a liquid entrapping device comprising the steps of: (a) producing at least one fiber from a solution comprising: at least one hydrophilogenic elastomerogenic component, wherein the at least one hydrophilogenic elastomerogenic component yields at least one hydrophilic elastomeric fibrous component; at least one absorbent component; and at least one wetting agent component; (b) collecting the at least one fiber; (c) using the at least one fiber to form a liquid entrapping device, wherein the at least one fiber includes at least one absorbent component in physical proximity with the resulting at least one hydrophilic elastomeric fibrous component, thereby resulting in fluid communication between the at least one absorbent component and the at least one hydrophilic elastomeric fibrous component.

In still another embodiment, the present invention relates to a process for making a liquid entrapping device comprising the steps of: (i) producing at least one fiber from a solution comprising: at least one hydrophilogenic elastomerogenic component, wherein the at least one hydrophilogenic elastomerogenic component yields at least one hydrophilic elastomeric fibrous component; at least one absorbent component; and at least one wetting agent component; (ii) collecting the at least one fiber; (iii) using the at least one fiber to form at least one fiber layer in the liquid entrapping device, wherein the at least one fiber includes at least one absorbent component in physical proximity with the resulting at least one hydrophilic elastomeric fibrous component, thereby resulting in fluid communication between the at least one absorbent component and the at least one hydrophilic elastomeric fibrous component.

In still yet another embodiment, the present invention relates to a liquid entrapping device comprising: at least one hydrophilic elastomeric fibrous component; and at least one wetting agent component, wherein the at least one hydrophilic elastomeric fibrous component and the at least one wetting agent component are in physical proximity resulting in fluid communication.

In still yet another embodiment, the present invention relates to a process for making a liquid entrapping device comprising the steps of: (A) producing at least one fiber from a solution comprising: at least one hydrophilogenic elastomerogenic component, wherein the at least one hydrophilogenic elastomerogenic component yields at least one hydrophilic elastomeric fibrous component; and at least one wetting agent component; (B) collecting the at least one fiber; (C) using the at least one fiber to form a liquid entrapping device, wherein the at least one fiber includes at least one hydrophilic elastomeric fibrous component in physical proximity with at least one wetting agent component, thereby resulting in fluid communication between at least one hydrophilic elastomeric fibrous component and at least one wetting agent component.

DETAILED DESCRIPTION OF THE INVENTION

Figure 1:
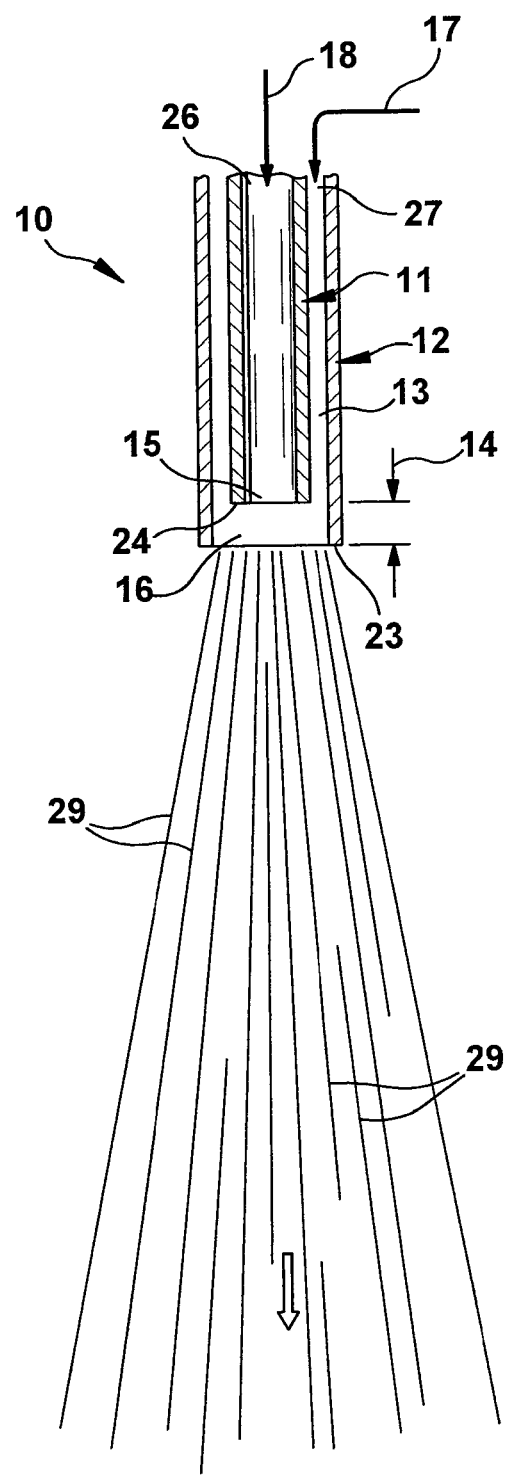
FIG. 1 is a schematic diagram of an apparatus for producing fibers and/or nanofibers according to one embodiment of the present invention.

The present invention relates to liquid entrapping devices (e.g., absorbent non-woven fibrous mats) and to a process for preparing such devices. More particularly, the present invention relates to mechanically strong absorbent materials made from such liquid entrapping devices (e.g., non-woven fibrous mats) and to a method for preparing same. In one embodiment, a liquid entrapping device of the present invention comprises at least one hydrophilic elastomeric fibrous component (HEFC) and at least one wetting agent component. In another embodiment, a liquid entrapping device of the present invention comprise at least one hydrophilic elastomeric fibrous component (HEFC), at least one absorbent component, and at least one wetting agent component. In one instance, the wetting agent component of the present invention is contained on and/or within the fibers and/or nanofibers that form the liquid entrapping device (e.g., a non-woven fibrous mat) of the present invention.

Initially, although the present invention is described in terms of non-woven fibrous mats as liquid entrapping devices, the present invention is not solely limited to such embodiments. Rather, as would be apparent to those of skill in the art, the present invention can be used to form any fiber-based structure including, but not limited to: non-woven mats; non-woven articles; or hybrid articles that contain, are combined with, or wholly and/or partially incorporate one or more liquid entrapping devices in accordance with the present invention.

Additionally, although certain end uses for the liquid entrapping devices of the present invention are contemplated and/or discussed herein, the present invention is not limited to such end uses. Suitable potential end uses for liquid entrapping devices in accordance with the present invention include, but are not limited to, wound dressings, bandages, personal hygiene products, incontinence pads, diapers, hemostats, sanitary pads, sanitary wipes, tampons, absorbent products and/or mats, spill absorbing devices, house wrap, coaxial cable liner, mop heads, or floor waxing devices.

Any hydrophilic elastomeric material can be used as the HEFC of the present invention provided that the hydrophilic elastomeric material it is capable of: (1) being spun into fibers, and (2) absorbing and wicking one or more liquids. In one alternative embodiment, the HEFC of the present invention is also capable of withstanding the strain that can result from any dimensional change or changes as a result of an increase in the size of the absorbent component upon exposure to one or more liquids. Suitable materials for use as the HEFC component of the present invention include, but are not limited to, blends, mixtures, or alloys of elastomerogenic and hydrophilogenic subcomponents. In another embodiment, the HEFC component of the present invention is a blend, mixture, or alloy of one or more elastomeric sub-components with one or more hydrophilic sub-components. In still another embodiment, the HEFC component of the present invention can be a single compound so long as the single compound is both elastomeric and hydrophilic. In still another embodiment, the HEFC of the present invention can be a blend, mixture or alloy of two or more compounds that are both elastomeric and hydrophilic in nature.

In still another embodiment, the HEFC of the present invention can be a copolymer, block copolymer, random copolymer, or the like of one or more elastomeric polymers in combination with one or more hydrophilic polymers. Still further materials within the scope of the present invention include homopolymers wherein the homopolymer is both hydrophilic and elastomeric.

Specific materials for use as the HEFC of the present invention include, but are not limited to, zein protein, polyester elastomers, polydimethylsiloxane, hydrophilic poly(ether-co-ester) elastomers, silicone-co-polyethyleneglycol elastomers, thermoplastic silicone elastomers, polyacrylates, thermoplastic polyurethanes, poly(ether-co-urethanes), polyurethanes, and mixtures of two or more thereof. In one embodiment, the HEFC of the present invention can be selected from one or more poly(ether-co-urethanes), polyurethanes, or combinations of two or more thereof.

Any absorbent material can be used as the absorbent component of the present invention provided it is capable of being located in physical proximity to the HEFC, thereby resulting in fluid communication between the at least one absorbent component and the at least one HEFC. In one embodiment, the at least one absorbent material is wettable by an aqueous or otherwise polar liquid. In one embodiment, the at least one absorbent material has a greater liquid holding capacity per unit of mass than the HEFC.

In contrast to the HEFC, no particular morphology is necessary to the operation of the absorbent component. For example, the at least one absorbent component can be, without limitation, amorphous, globular, elongated, fibrous, azimuthal, ellipsoidal, and/or spherical. Moreover, no particular stress-strain relationship is necessary to the performance of the at least one absorbent material. Thus, the absorbent material can be, without limitation, substantially rigid, pliable, elastic, gelatinous, fluid or brittle. Suitable absorbent materials for use in the present invention include, but are not limited to, polyesters, polyethers, polyester-polyethers, polymers having pendant acids or pendant hydroxyls, polysiloxanes, polyacrylamides, Kaolins, Serpentines, Smectites, Glauconite, Chlorites, Vermiculites, Attapulgite, Sepiolite, Allophane and Imogolite, sodium polyacrylates, crosslinked polyacrylate copolymers, 2-propenamide-co-2-propenoic acid, and suitable mixtures of two or more thereof. In one embodiment, the at least one absorbent component of the present invention is selected from one or more sodium polyacrylates, 2-propenamide-co-2-propenoic acid, or suitable mixtures of two or more thereof.

The absorbent material of the present invention can have any of a wide range of absorbencies. In one embodiment, the at least one absorbent component of the present invention has a greater absorbency than the HEFC. In another embodiment, the at least one absorbent component of the present invention is a super absorbent. The term "super absorbent" is hereby defined to mean a material that is capable of absorbing an amount of a liquid equal to at least two times its own weight. In another embodiment, a super absorbent in accordance with the present invention is capable of absorbing an amount of a liquid equal to at least about three times its own weight, or at least about four times its own weight, or at least about seven times its own weight, or at least about 15 times its own weight, or at least about 20 times its own weight, or at least about 25 times its own weight, or at least about 50 times its own weight, or at least about 75 times its own weight, or even at least about 100 times its own weight. It should be noted that here, as well as elsewhere in the specification and claims, different individual range limits can be combined to form new ranges.

In still another embodiment, a super absorbent in accordance with the present invention is capable of absorbing an amount of a liquid equal to at least about 150 times its own weight, or at least about 200 times its own weight, or even at least about 250 times its own weight. In still another embodiment, a super absorbent in accordance with the present invention is capable of absorbing an amount of a liquid equal to at least about 300 times its own weight, or at least about 350 times its own weight, or at least about 400 times its own weight, or at least about 450 times its own weight, or even at least about 500 times its own weight. It should be noted that here, as well as elsewhere in the specification and claims, different individual range limits can be combined to form new ranges.

In one embodiment, the amount of the at least one absorbent component present in the non-woven fibrous mats of the present invention ranges from about 1 weight percent to about 85 weight percent based on the amount of the one or more HEFCs present. In another embodiment, the amount of the at least one absorbent component present in the non-woven fibrous mats of the present invention ranges from about 5 weight percent to about 70 weight percent, or even from about 30 weight percent to about 50 weight percent based on the amount of the one or more HEFCs present. It should be noted that here, as well as elsewhere in the specification and claims, different individual range limits can be combined to form new ranges.

The at least one absorbent component of the present invention can be distributed in any manner so long as the manner of distribution results in the at least one absorbent component being in fluid communication with the HEFC. For instance, the absorbent material may be coated on the surface of the HEFC. In one embodiment, the at least one absorbent component can be physisorbed or chemisorbed on the surface of the HEFC. In another embodiment, the at least one absorbent component can be affixed to the surface in any other appropriate manner (e.g., sprayed on after formation of the HEFC fibers). In still another embodiment, the at least one absorbent component can be mechanically entrapped or entangled in the hydrophilic elastomeric component fibers (HEFC). Alternatively, the absorbent component can be embedded in the HEFC. Additionally, any combination of the foregoing arrangements is also within the scope of the present invention.

Any of the foregoing distributions can be utilized in the absorbent non-woven fibrous mats of the present invention depending upon the physical properties of the one or more absorbent components to be contained therein. For instance, if the at least one absorbent component has a tendency to slough off it may be desirable to embed such an absorbent in the HEFC rather than bond it or apply it to the fiber surface of the HEFC. On the other hand, if the absorbent material can be substantially irreversibly bonded to the outer surface of the hydrophilic elastomeric component fibers then coating may be more desirable. Additionally if, the mass transfer rate from the fiber to the absorbent material is slow enough to the extent that the device is substantially non-functional then coating the absorbent component onto the fibers may be more desirable.

In one embodiment a solution of a hydrophilic material is mixed with a solution of an elastomeric material and the mixture of the two is then spun resulting in a fiber comprising both materials. Fibers made in this manner can have a homogenous composition, wherein the elastomeric and hydrophilic materials are uniformly distributed. Alternatively, the fibers can comprise well-defined phases, or a portion of the fiber may be a homogenous solid solution while another portion of the fiber may be phase-separated. In another embodiment, the fibers of the present invention can comprise a block copolymer wherein the blocks further comprise elastomeric blocks and hydrophilic blocks. The blocks can be arranged randomly or in any of a variety of suitable patterns.

In another embodiment, all of the necessary compounds to create and/or generate one or more liquid entrapping devices of the present invention are combined together and are processed in a single electrospinning and/or nanofiber by gas jet processing step. That is, although not limited thereto, certain process embodiments of the present invention permit the formation and/or production of liquid entrapping devices in a single step.

In any case, the fibers of the present invention function primarily as a conduit for delivering liquids to the at least one absorbent component resulting in the entrapment of the one or more liquids within the absorbent non-woven fibrous mats of the present invention. Thus, the fibers of the present invention act as multiple wicks in the sense that they provide a means for fluid flow. This wicking property coupled with a difference in absorption capacity and rate between the HEFC and the absorbent component results in a net flow to the absorbent component.

In one embodiment, the HEFC both absorbs more quickly than the at least one absorbent component and has a smaller holding capacity than the at least one absorbent component. In this embodiment, the HEFC tends to reach its holding capacity in less time. Thus, there tends to be a net flow from the fiber to the absorbent component thereby permitting the at least one absorbent component to absorb additional amounts of the one or more liquids present.

In another embodiment, the HEFC both absorbs more slowly than the at least one absorbent component and has a smaller holding capacity than the at least one absorbent component. In this embodiment, the HEFC tends to act more as a wicking component, than an alternative absorption component of the present invention. Thus, there tends to be a flow from around and/or on the HEFC fibers to the absorbent component thereby permitting the at least one absorbent component to absorb suitable amounts of the one or more liquids present.

Fibers of the present invention can be fabricated according to a variety of methods known in the art including electrospinning, wet spinning, dry spinning, melt spinning, gel spinning and nanofibers by gas jet (NGJ). Electrospinning is particularly suitable for fabricating fibers of the present invention inasmuch as it tends to produce the thinnest (i.e., finest denier) fibers of any of the foregoing methods. Electrospinning techniques are described in U.S. Pat. Nos. 4,043,331, 4,878,908; and 6,753,454, which are hereby incorporated by reference in their entireties.

Another particularly effective method for producing nanofibers of the present invention comprises the nanofibers by gas jet method (i.e., NGJ method). Techniques and apparatuses for forming fibers via NGJ are described in U.S. Pat. Nos. 6,382,526; 6,520,425; and 6,695,992, which are hereby incorporated by reference in their entireties.

Briefly, an NGJ method comprises using a device having an inner tube and a coaxial outer tube with a sidearm. The inner tube is recessed from the edge of the outer tube thus creating a thin film-forming region. Polymer melt is fed in through the sidearm and fills the empty space between the inner tube and the outer tube. The polymer melt continues to flow toward the effluent end of the inner tube until it contacts the effluent gas jet. The gas jet impinging on the melt surface creates a thin film of polymer melt, which travels to the effluent end of tube where it is ejected forming a turbulent cloud of nanofibers. A more detailed discussion of various NGJ processes, within the scope of the present invention, are described below. It should be noted however, the present invention is not limited to solely the NGJ and/or electrospinning processes described, or incorporated, herein.

Electrospinning and NGJ techniques permit the processing of polymers from both organic and aqueous solvents. Furthermore, based on the present invention, these techniques permit the incorporation, dispersion (both homogeneous and heterogeneous dispersions), and/or localized dispersion of discrete particles and/or soluble non-fiber forming additives into the resulting fibers via the spinning/gas jet fluid. Accordingly, the one or more absorbent components in conjunction and/or combination with the one or more wetting agents can be incorporated in and/or on the fibers used to form the absorbent non-woven fibrous mats of the present invention.

In one embodiment, the diameter of the fibers and/or nanofibers utilized and/or contained in the present invention ranges from about 1 nanometer to about 20,000 nanometers, or from about 10 nanometers to about 10,000 nanometers, or from about 20 nanometers to about 5,000 nanometers, or from about 30 nanometers to about 2,500 nanometers, or from about 40 nanometers to about 1,000 nanometers, or from about 50 nanometers to about 500 nanometers, or even from about 60 nanometers to about 250 nanometers In another embodiment, the fibers used in the present invention are electrospun fibers having diameters within the range of about 3 nanometers to about 3000 nanometers, of from about 10 nanometers to about 500 nanometers, or even from about 25 nanometers to about 100 nanometers. Again, here, as well as elsewhere in the specification and claims, different individual range limits can be combined to form new ranges.

The length of the fibers contained in the present invention is not critical. Any length fibers can be used. Suitable fiber lengths include, but are not limited to, fibers of at least about 1 centimeter in length, fibers of at least about 10 centimeters in length, fibers of at least about 50 centimeters in length, fibers of at least about 1 meter in length, fibers of at least about 5 meters in length, fibers of at least about 25 meters in length, fibers of at least about 50 meters in length, fibers of at least about 100 meters in length, fibers of at least about 250 meters in length, fibers of at least about 500 meters in length, fibers of at least about 1 kilometer in length, and even fibers of at least about 5 kilometers in length. Again, it should be noted that here, as well as elsewhere in the specification and claims, different individual range limits can be combined to form new ranges.

Suitable wetting agents for use in the present invention include, but are not limited to, one or more soaps (e.g., detergents), alcohols, fatty acids, surfactants, glycerols, sugars, polysaccharides, and low molecular weight polymers. In one embodiment, the wetting agent can be any non-ionic, anionic or cationic compound that when in the presence of one or more liquids causes at least one of the liquids present to penetrate more easily into, or to spread more easily over the surface of, another material by reducing the surface tension of the one or more liquids present, In another embodiment, the wetting agent is a surfactant. In still another embodiment, the wetting agent is a polyoxyethylene sorbitan monolaurate (e.g., Tween® 20), glycerol, ionic silicone surfactants, one or more quaternary polydimethyl siloxanes (e.g., a diquaternary polydimethyl siloxane such as Tegopren® 6921, from Degussa of Germany), or a combination of two or more thereof.

In one embodiment, the amount of wetting agent present in the non-woven fibrous mats of the present invention ranges from about 0.001 weight percent to about 1.0 weight percent based on the total weight of the absorbent and hydrophilic elastomeric fibrous components. In another embodiment, the amount of wetting agent present in the non-woven fibrous mats of the present invention ranges from about 0.025 weight percent to about 0.5 weight percent, or from about 0.05 weight percent to about 0.25 weight percent, or even from about 0.075 weight percent to about 0.1 weight percent based on the total weight of the absorbent and hydrophilic elastomeric fibrous components. Again, it should be noted that here, as well as elsewhere in the specification and claims, different individual range limits can be combined to form new ranges.

As discussed above, the process by which the non-woven fibrous mats of the present invention are formed can permit the addition of a combination of at least one absorption component and at least one wetting agent to the fiber forming solution. Specifically with regard to the one or more wetting agents of the present invention, the inclusion of the one or more wetting agents in the fiber forming solution of the present invention enables the one or more wetting agents to be incorporated in, dispersed on, and/or dispersed within the fibers that form the non-woven mats of the present invention. The dispersion of the one or more wetting agents in, on and/or within the fibers that make up the non-woven mats of the present invention can be heterogeneous or homogeneous dispersions. That is, in one embodiment of the present invention areas of higher wetting agent concentration can exist in the non-woven mats in accordance with the present invention.

In one embodiment, the at least one wetting agent is sprayed onto the fibers that make-up the non-woven fibrous mats of the present invention. In another embodiment, the at least one wetting agent is incorporated into the fiber forming solution thereby permitting the formation of fibers and/or non-woven mats that contain one or more wetting agents within the individual fibers of a non-woven mat.

As is discussed above, fibers in accordance with the present invention can be formed by an NGJ process. To this end, one such exemplary process is described below. However, it should again be noted that the present invention is not limited to solely this NGJ process, other suitable NGJ and/or electrospinning processes could also be employed to produce the fibers disclosed herein.

A nozzle 10 that is employed in practicing an NGJ process that can be used to produce fibers/nanofibers in accordance with the present invention is best described with reference to FIG. 1. Nozzle 10 includes a center tube II having an entrance orifice 26 and an outlet orifice 15. The diameter of center tube II can vary based upon the need for gas flow, which impacts the velocity of the gas as it moves a film of liquid across the jet space 14, as will be described below. In one embodiment, the diameter of tube 11 is from about 0.5 to about 10 mm, or even from about 1 to about 2 mm. Likewise, the length of tube 11 can vary depending upon construction conveniences, heat flow considerations, and shear flow in the fluid. In one embodiment, the length of tube 11 will be from about 1 to about 20 cm, or even from about 2 to about 5 cm. Positioned concentrically around and apart from the center tube 11 is a supply tube 12, which has an entrance orifice 27 and an outlet orifice 16. Center tube 11 and supply tube 12 create an annular space or column 13. This annular space or column 13 has a width, which is the difference between the inner and outer diameter of the annulus, that can vary based upon the viscosity of the fluid and the maintenance of a suitable thickness of fiber-forming material fluid on the inside wall of gas jet space 14. In one embodiment, the width is from about 0.05 to about 5 mm, or even from about 0.1 to about 1 mm. Center tube 11 is vertically positioned within supply tube 12 so that a gas jet space 14 is created between lower end 24 of center tube 11 and lower end 23 of supply tube 12. The position of center tube 11 is adjustable relative to lower end 23 of supply tube 12 so that the length of gas jet space 14 is adjustable. Gas jet space 14, i.e., the distance between lower end 23 and lower end 24, is adjustable so as to achieve a controlled flow of fluid along the inside of tube 12, and optimal conditions for nanofiber production at the end 23 of tube 12. In one embodiment, this distance is from about 0.1 to about 10 mm, or even from about 1 to about 2 mm. It should be understood that gravity will not impact the operation of the apparatus of this invention, but for purposes of explaining the present invention, reference will be made to the apparatus as it is vertically positioned as shown in FIGS. 1 through 10.

It should be appreciated that the supply tube outlet orifice 16 and gas jet space 14 can have a number of different shapes and patterns. For example, the space 14 can be shaped as a cone, bell, trumpet, or other shapes to influence the uniformity of fibers launched at the orifice. The shape of the outlet orifice 16 can be circular, elliptical, scalloped, corrugated, or fluted. Still further, the inner wall of supply tube 12 can include slits or other manipulations that may alter fiber formation. These shapes influence the production rate and the distribution of fiber diameters in various ways.

According to the present invention, nanofibers are produced by using the apparatus of FIG. 1 by the following method. Fiber-forming material that includes therein the necessary fiber forming components is provided by a source 17, and fed through annular space 13. The fiber-forming material is directed into gas jet space 14. Simultaneously, pressurized gas is forced from a gas source 18 through the center tube 11 and into the gas jet space 14.

Within gas jet space 14 it is believed that the fiber-forming material is in the form of an annular film. In other words, fiber-forming material exiting from the annular space 13 into the gas jet space 14 forms a thin layer of fiber-forming material on the inside wall of supply tube 12 within gas jet space 14. This layer of fiber-forming material is subjected to shearing deformation by the gas jet exiting from center tube outlet orifice 15 until it reaches the fiber-forming material supply tube outlet orifice 16. At this point, it is believed that the layer of fiber-forming material is blown apart into many small strands 29 by the expanding gas and ejected from orifice 16 as shown in FIG. 1. Once ejected from orifice 16, these strands solidify and form nanofibers. This solidification can occur by cooling, chemical reaction, coalescence, ionizing radiation or removal of solvent.

As noted above, the fibers produced according to one embodiment of this process are nanofibers and have an average diameter that is less than about 3,000 nanometers, or from about 3 to about 1,000 nanometers, or even from about 10 to about 500 nanometers. The diameter of these fibers can be adjusted by controlling various conditions including, but not limited to, temperature and gas pressure. The length of these fibers can widely vary to include fibers that are as short as about 0.01 mm up to those fibers that are about many kilometers in length. Within this range, the fibers can have a length from about 1 mm to about 1 km, and more narrowly from about 1 cm to about 1 mm. The length of these fibers can be adjusted by controlling the solidification rate.

As discussed above, pressurized gas is forced through center tube 11 and into jet space 14. This gas should be forced through center tube 11 at a sufficiently high pressure so as to carry the fiber forming material along the wall of jet space 14 and create nanofibers. Therefore, in one embodiment, the gas is forced through center tube 11 under a pressure of from about 10 to about 5,000 pounds per square inch (psi), or even from about 50 to about 500 psi.

The term gas as used throughout this specification includes any gas. Non-reactive gases are preferred. Such a term refers to those gases, or combinations thereof, that will not deleteriously impact the fiber-forming material. Examples of these gases include, but are not limited to, nitrogen, helium, argon, air, carbon dioxide, steam fluorocarbons, fluorochlorocarbons, and mixtures thereof. It should be understood that for purposes of this specification, gases will also refer to those super heated liquids that evaporate at the nozzle when pressure is released, e.g., steam. It should further be appreciated that these gases may contain solvent vapors that serve to control the rate of drying of the nanofibers made from polymer solutions. Still further, useful gases include those that react in a desirable way, including mixtures of gases and vapors or other materials that react in a desirable way. For example, it may be useful to employ gas streams that include molecules that serve to crosslink polymers Still further, it may be useful to employ gas streams that include metals that serve to improve the production of fibers/nanofibers.

Figure 2:
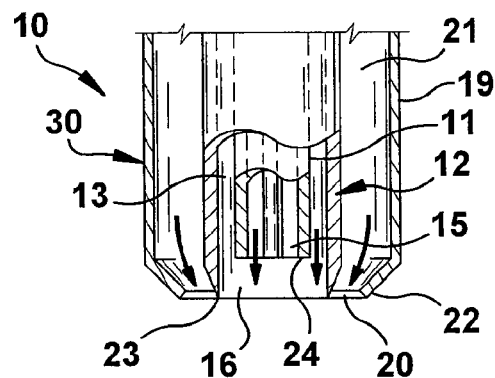
FIG. 2 is a schematic representation of one embodiment of an apparatus that can be used to produce fibers and/or nanofibers according to another embodiment of the present invention, wherein the apparatus includes a lip cleaner assembly.
Figure 3:
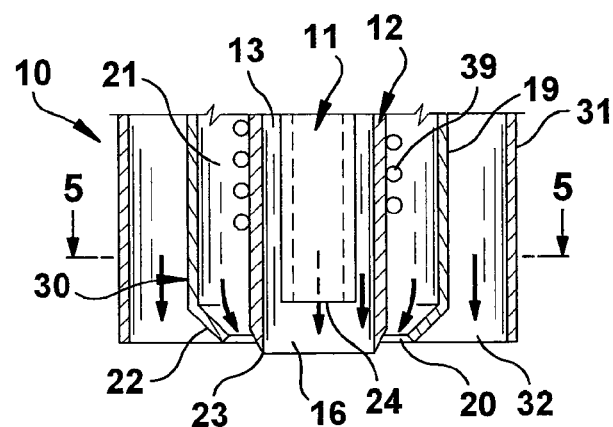
FIG. 3 is a schematic representation of one embodiment of an apparatus that can be used to produce fibers and/or nanofibers according to still another embodiment of the present invention, wherein the apparatus includes an outer gas shroud assembly.
Figure 4:
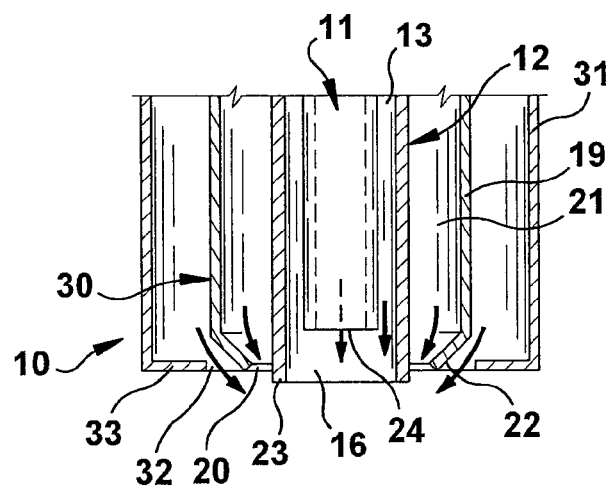
FIG. 4 is a schematic representation of one embodiment of an apparatus that can be used to produce fibers and/or nanofibers according to still yet another embodiment of the present invention, wherein the apparatus includes an outer gas shroud, and the shroud is modified with a partition.

In another embodiment, as is shown in FIG. 2, nozzle 10 further comprises a lip cleaner 30. Within this assembly, an outer gas tube 19 is positioned concentrically around and apart from supply tube 12. Outer gas tube 19 extends along supply tube 12 and thereby creates a gas annular column 21. Lower end 22 of outer gas tube 19 and lower end 23 of supply tube 12 form lip cleaner orifice 20. In one embodiment, lower end 22 and lower end 23 are on the same horizontal plane (flush) as shown in FIG. 2. In another embodiment, however, lower ends 22 and 23 may be on different horizontal planes as shown in FIGS. 3 and 4. As also shown in FIG. 2, outer gas tube 19 preferably tapers and thereby reduces the size of annular space 21. Pressurized gas is forced through outer gas tube 19 and exits from outer gas tube 19 at lip cleaner orifice 20, thereby preventing the build up of residual amounts of fiber-forming material that can accumulate at lower end 23 of supply tube 12. The gas that is forced through gas annular column 21 should be at a sufficiently high pressure so as to prevent accumulation of excess fiber-forming material at lower end 23 of supply tube 12, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 16, and therefore lip cleaner 30 of this environment serves both to clean the lip and control the flow of exiting fiber strands.

Figure 5:
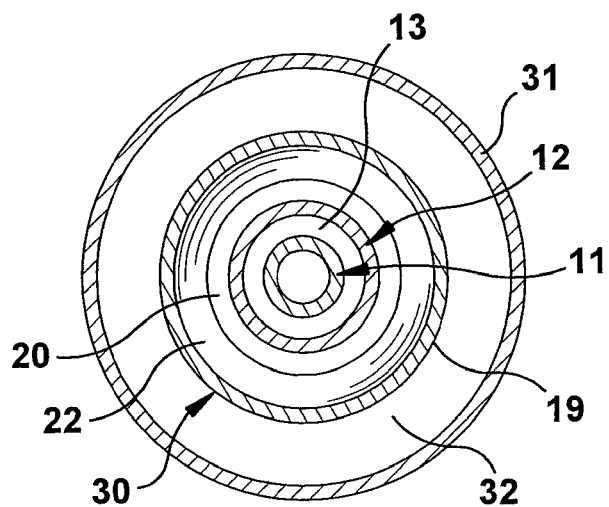
FIG. 5 is a cross sectional view taken along line 5-5 of the embodiment shown in FIG. 3.

In yet another embodiment, which is shown in FIGS. 3, 4 and 5, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas controls the cooling rate, solvent evaporation rate of the fluid, or the rate chemical reactions occurring within the fluid. It should be understood that the general shape of the gas shroud is controlled by the width of the annular tube orifice 32 and its vertical position with respect to bottom 23 of tube 12. The shape is further controlled by the pressure and volume of gas flowing through the shroud. It should be further understood that the gas flowing through the shroud is preferably under a relatively low pressure and at a relatively high volume flow rate in comparison with the gas flowing through center tube 11.

In one embodiment, shroud gas tube orifice 32 is in an open configuration, as shown in FIG. 3. in another embodiment, as shown in FIG. 4, orifice 32 is in a constricted configuration, wherein the orifice is partially closed by a shroud partition 33 that adjustably extends from shroud gas tube 31 toward lower end 23.

Figure 6:
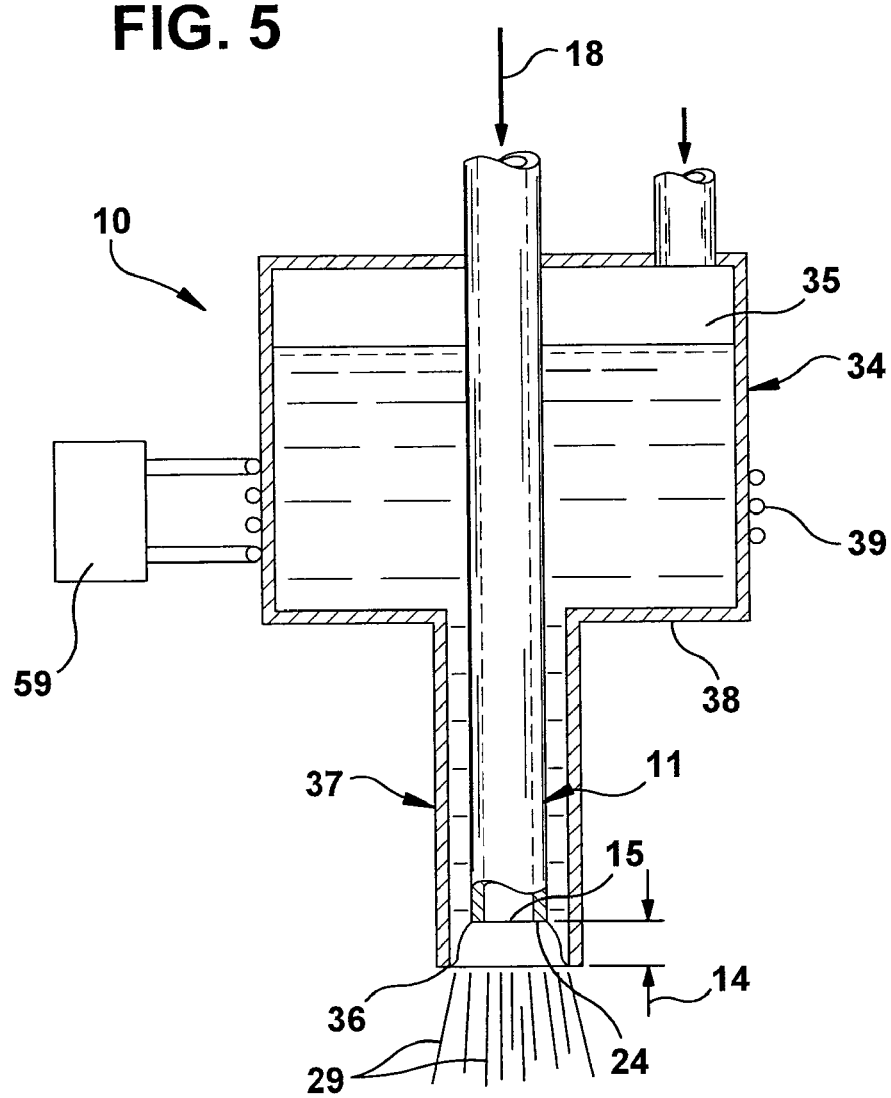
FIG. 6 is a schematic representation of one embodiment of an apparatus that can be used to produce fibers and/or nanofibers according to still yet another embodiment of the present invention, wherein the apparatus is designed for batch processes.

In practicing the present invention, a spinnable fluid or fiber-forming material can be delivered to annular space 13 by several techniques. For example, and as shown in FIG. 6, the fiber-forming material can be stored within nozzle 10. This is especially useful for batch operations. As with the previous embodiments, nozzle 10 will include a center tube 11. Positioned, preferably concentrically, around center tube 11 is a fiber-forming material container 34, comprising container walls 38, and defining a storage space 35. The size of storage space 35, and therefore the volume of spinnable fluid stored within it, will vary according to the particular application to which the present invention is put. Fiber-forming material container 34 further comprises a supply tube 12. Center tube 11 is inserted into fiber-forming material container 34 in such a way that a center tube outlet orifice 15 is positioned within the outlet tube 37, creating a gas jet space 14 between the lower end 24 of center outlet 11 and the lower end 36 of outlet tube 37. The position of center tube 11 is vertically adjustable relative to lower end 36 so that the length of the gas jet space 14 is likewise adjustable. As with previously described embodiments, gas jet space 14, i.e., the distance between lower end 36 and lower end 24, is adjustable so as to achieve a uniform film within space 14 and thereby produce uniform fibers with small diameters and high productivity. In one embodiment, this distance is from about 1 to about 2 mm, or even from about 0.1 to about 5 mm. The length of outlet tube 37 can be varied according to the particular application of the present invention. If container wall 38 is of sufficient thickness, such that a suitable gas jet space can be created within wall 38, then outlet tube 37 may be eliminated.

According to this embodiment, nanofibers are produced by using the apparatus of FIG. 6 according to the following method. Pressure is applied to the container so that fiber-forming material is forced from storage space 35 into gas jet space 14. The pressure that is applied can result from gas pressure, pressurized fluid, or molten polymer from an extruder. Simultaneously, pressurized gas is forced from a gas source 18, through center tube 11, and exits through center tube orifice 15 into gas jet space 14. As with previous embodiments, heat may be applied to the fiber-forming material prior to or after being placed in fiber-forming material container 34, to the pressurized gas entering center tube 11, and/or to storage space 35 by heat source 39 or additional heat sources. Fiber-forming material exiting from storage space 35 into gas jet space 14 forms a thin layer of fiber-forming material on the inside wall of gas jet space 14. This layer of fiber-forming material is subjected to shearing deformation, or other modes of deformation such as surface wave, by the gas jet until it reaches container outlet orifice 36. There the layer of fiber-forming material is blown apart, into many small strands, by the expanding gas.

Figure 7:
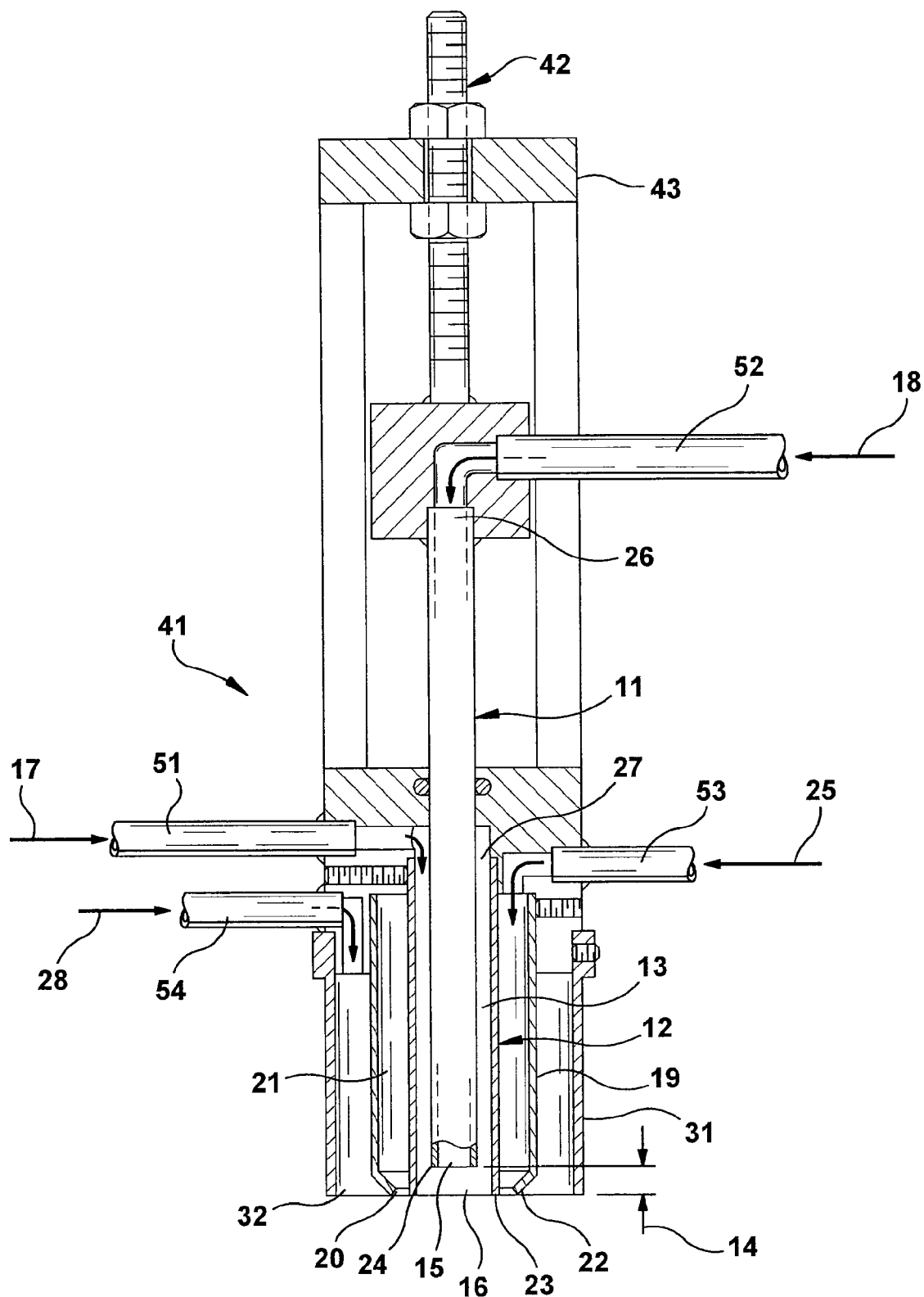
FIG. 7 is a schematic representation of one embodiment of an apparatus that can be used to produce fibers and/or nanofibers according to still yet another embodiment of the present invention, wherein the apparatus is designed for continuous processes.

In still another embodiment, as shown in FIG. 7, the fiber-forming material can be delivered on a continuous basis rather than a batch basis as in FIG. 6. In this embodiment, the apparatus is a continuous flow nozzle 41. Consistent with previous embodiments, nozzle 41 comprises a center tube 11, a supply tube 12, an outer gas tube 19, and a gas shroud tube 31. Supply tube 12 is positioned concentrically around center tube 11. Outer gas tube 19 is positioned concentrically around supply tube 12. Gas shroud tube 31 is positioned concentrically around outer gas tube 19. Center tube 11 has an entrance orifice 26 and an outlet orifice 15. As in previous embodiments, the diameter of center tube 11 can vary. In one embodiment, the diameter of tube 11 is from about 1 to about 20 mm, or even from about 2 to about 5 mm. Likewise the length of tube 11 can vary. In one embodiment, the length of tube 11 will be from about 1 to about 10 cm, or even from about 2 to about 3 cm.

Positioned concentrically around the center tube 11 is a supply tube 12 that has an entrance orifice 27 and an outlet orifice 16. The center tube 11 and supply tube 12 create an annular space or column 13. This annular space or column 13 has a width, that can vary, which is the difference between the inner and outer diameter of the annulus. In a one embodiment, the width is from about 0.05 to about 5 mm, or even from about 0.1 to about 1 mm.

Center tube 11 is vertically positioned within the supply tube 12 so that a gas jet space 14 is created between the lower end 24 of center tube 11 and the lower end 23 of supply tube 12. The position of center tube 11 is adjustable relative to supply tube outlet orifice 16 so that the size of gas jet space 14 is adjustable. As with previously embodiments, the gas jet space 14, i.e., the distance between lower end 23 and lower end 24, is adjustable. In one embodiment this distance is from about 0.1 to about 10 mm, or even from about 1 to about 2 mm.

Center tube 11 is attached to an adjustment device 42 that can be manipulated such as by mechanical manipulation. In one particular embodiment as shown in FIG. 7, the adjustment device 42 is a threaded rod that is inserted through a mounting device 43 and is secured thereby by a pair of nuts threaded onto the rod.

In this embodiment, supply tube 12 is in fluid tight communication with supply inlet tube 51. Center tube 11 is in fluid tight communication with pressurized gas inlet tube 52, outer gas tube 19 is in fluid tight communication with the lip cleaner gas inlet tube 53, and gas shroud tube 31 is in fluid tight communication with shroud gas inlet tube 54. This fluid tight communication is achieved by use of a connector, but other means of making a fluid tight communication can be used, as known by those skilled in the art.

According to the present invention, nanofibers are produced by using the apparatus of FIG. 7 by the following method. Fiber-forming material is provided by a source 17 through supply inlet tube 51 into and through annular space 13, and then into gas jet space 14. In one embodiment, the fiber-forming material is supplied to the supply inlet tube 51 under a pressure of from about 0 to about 15,000 psi, or even from about 100 to about 1,000 psi. Simultaneously, pressurized gas is forced through inlet tube 52, through center tube 11, and into gas jet space 14. As with previously described embodiments, it is believed that fiber-forming material is in the form of an annular film within gas jet space 14. This layer of fiber-forming material is subjected to shearing deformation by the gas jet exiting from the center tube outlet orifice 15 until it reaches the fiber-forming material supply tube outlet orifice 16. At this point, it is believed that the layer of fiber-forming material is blown apart into many small strands by the expanding gas. Once ejected from orifice 16, these strands solidify in the form of nanofibers. This solidification can occur by cooling, chemical reaction, coalescence, ionizing radiation or removal of solvent. As with previously described embodiments also simultaneously, pressurized gas is supplied by gas source 25 to lip cleaner inlet tube 53 into outer gas tube 19.

As with previous embodiments, the outer gas tube 19 extends along supply tube 12 and thereby creates an annular column of gas 21. The lower end 22 of gas annular column 21 and the lower end 23 of supply tube 12 form a lip cleaner orifice 20. In this embodiment, lower end 22 and lower end 23 are on the same horizontal plane (flush) a shown in FIG. 7. As noted above, however, lower ends 22 and 23 may be on different horizontal planes. The pressurized gas exiting through lip cleaner orifice 20 prevents the buildup of residual amounts of fiber-forming material that can accumulate at lower end 23 of supply tube 12. Simultaneously, pressurized gas is supplied by gas source 28 through shroud gas inlet tube 54 to shroud gas tube 31. Pressurized gas is forced through the shroud gas tube 31 and exits from the shroud gas tube orifice 32 thereby creating a shroud of gas around the nanofibers that control the cooling rate of the nanofibers exiting from tube orifice 16. In one particular embodiment, fiber-forming material is supplied by an extruder.

Figure 8:
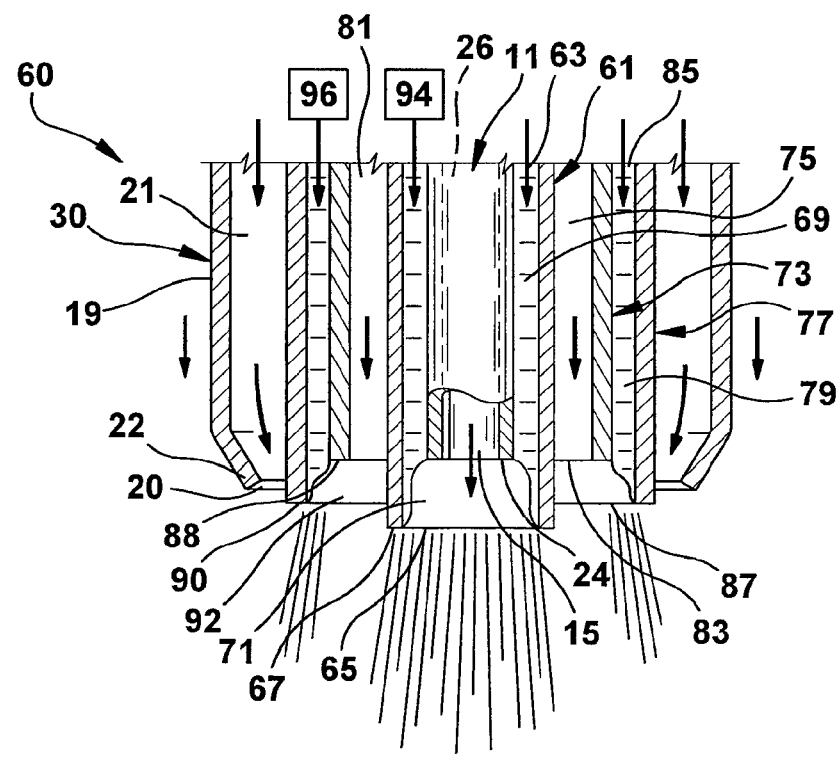
FIG. 8 is a schematic representation of one embodiment of an apparatus that can be used to produce fibers and/or nanofibers according to still yet another embodiment of the present invention, wherein the apparatus is designed for the production of a mixture of nanofibers from one or more polymers simultaneously.
Figure 9:
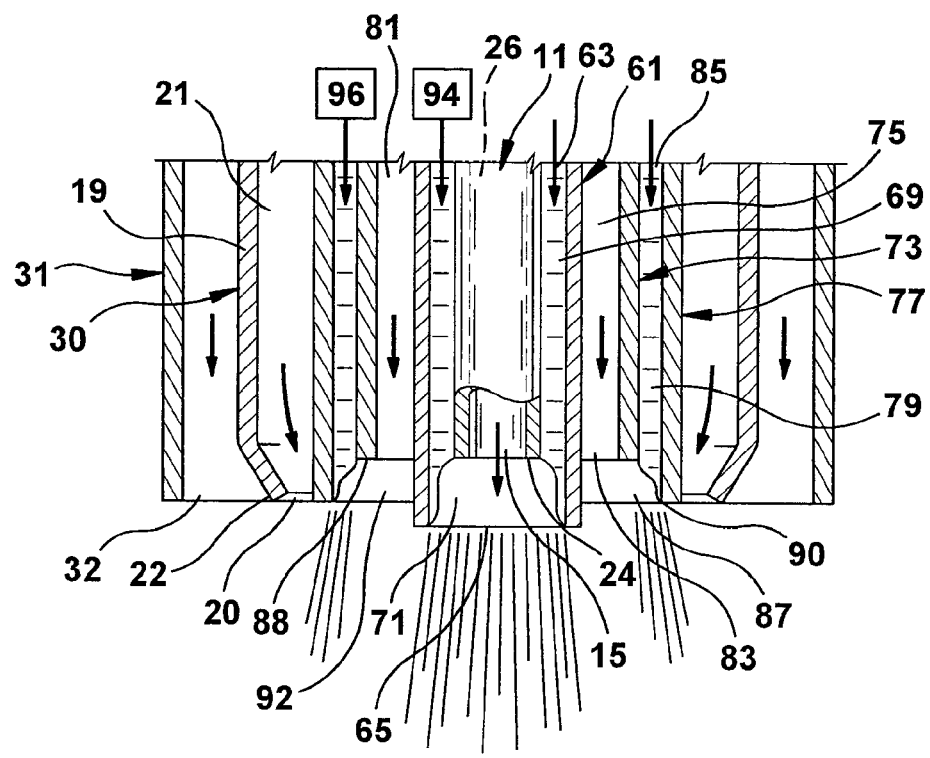
FIG. 9 is a schematic representation of one embodiment of an apparatus that can be used to produce fibers and/or nanofibers according to still yet another embodiment of the present invention, wherein the apparatus includes an outer gas shroud assembly.
Figure 10:
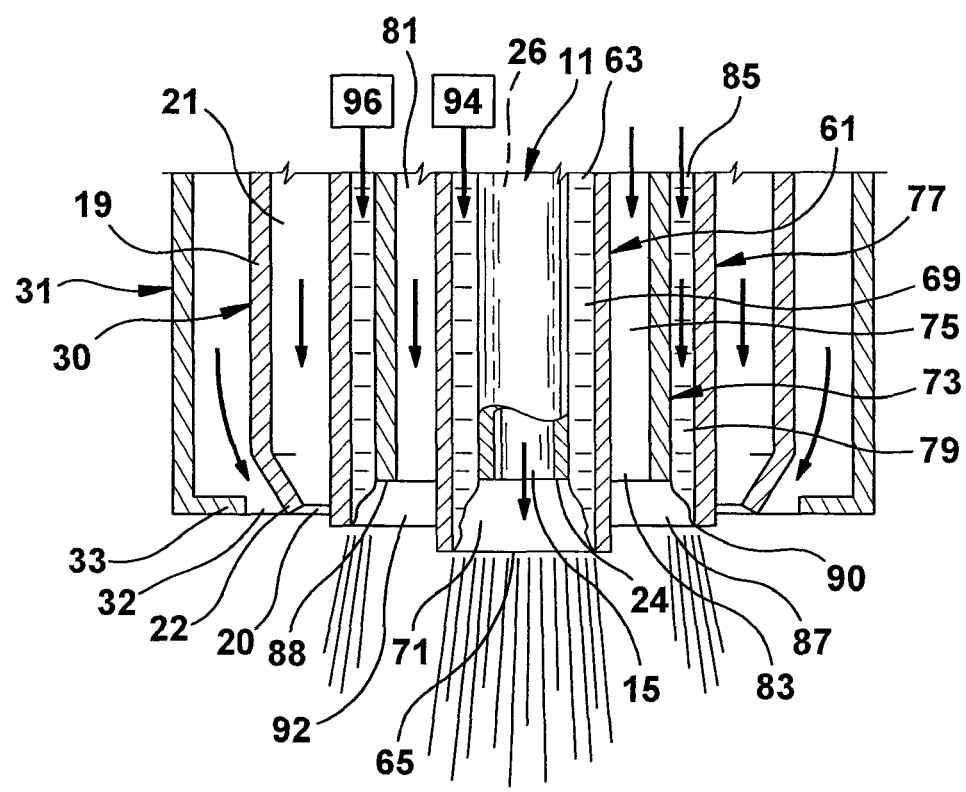
FIG. 10 is a schematic representation of another embodiment of an apparatus that can be used to produce fibers and/or nanofibers according to still yet another embodiment of the present invention, wherein the apparatus includes an outer gas shroud, having a partition directed radially inward at an end thereof.

A mixture of nanofibers can be produced from the nozzles shown in FIG. 8 through 10. In these embodiments, a plurality of gas tubes and supply tubes are concentrically positioned in an alternating manner such that a plurality of gas jet spaces are created. In previously described embodiments, a single supply tube and a single gas tube create a single gas jet space.

As shown in FIG. 8, nozzle 60 includes a center tube 11 having an entrance orifice 26 and an outlet orifice 15. The diameter of center tube 11 can vary based upon the need for gas flow. Center tube 11 may be specifically adapted to carry a pressurized gas. Positioned concentrically around center tube 11 is a first supply tube 61 that has an entrance orifice 63 and an exit orifice 65. Center tube 11 and first supply tube 61 create a first supply annular space or column 69. First supply tube 61 may be specifically adapted to carry a fiber-forming material. Furthermore, center tube 11 and first supply tube 61 may be positioned such that they are essentially parallel to each other.

As with previous embodiments, center tube 11 is positioned within first supply tube 61 so that a first gas jet space 71 is created between the lower end 24 of center tube 11 and the lower end 67 of first supply tube 61. The position of center tube 11 may be adjustable relative to lower end 67 of first supply tube 61 so that the length of first gas jet space 71 is adjustable. Also, the width of first supply annular space or column 69 can be varied to accommodate the viscosity of the fluid and the maintenance of a suitable thickness of fiber-forming material on the inside wall of first gas jet space 71.

Nozzle 60 also has a middle gas tube 73 positioned concentrically around and apart from first supply tube 61. Middle gas tube 73 extends along first supply tube 61 and thereby creates a middle gas annular column 75. Middle gas tube 73 has an entrance orifice 81 and an exit orifice 83.

Unlike previous embodiments, a second supply tube 77 is positioned concentrically around middle gas tube 73, which creates a second supply annular space or column 79. Second supply tube 77 has an entrance orifice 85 and an exit orifice 87. As with first supply tube 61, second supply tube 77 may be specifically adapted to carry a fiber forming material. Middle gas tube 73 is positioned within second supply tube 77 so that a second gas jet space 92 is created between the lower end 88 of middle gas tube 73 and the lower end 90 of second supply tube 77. The position of middle gas tube 73 may be adjustable relative to lower end 90 of second supply tube 77 so that the length of second gas jet space 92 is adjustable. The dimensions of first and second gas jet spaces, 71 and 92 respectively, are adjustable in order to achieve a controlled flow of fiber-forming material along the inside of first supply tube 61 and second supply tube 77, and thereby provide optimal conditions for nanofiber production at ends 67 and 90 of tubes 61 and 77. In one embodiment, the distance between ends 88 and 90, and between ends 24 and 67, is from about 0.1 to about 10 mm, or even from about 1 to about 2 mm. In one example of this embodiment, lower end 90 and lower end 67 are on different horizontal planes as shown in FIG. 8. In another example of this embodiment, lower end 90 is on the same horizontal plane (flush) as lower end 67 (not shown).

For purposes of clarity, the present embodiments as shown in FIGS. 8 through 10 feature two supply tubes and corresponding gas supply tubes, but it is envisioned that any multiple of supply tubes and gas tubes can be positioned concentrically around center tube 11 in the same repeating pattern as described above.

Nozzle 60 optionally further comprises a lip cleaner 30, as shown in FIG. 8. Lip cleaner 30 comprises an outer air tube 19 positioned concentrically around and apart from second supply tube 77, as shown in FIG. 8, or concentrically around the outermost supply tube if more than two supply tubes are present as mentioned above. Outer gas tube 19 extends along second supply tube 77 and thereby creates a gas annular column 21. A lower end 22 of outer gas tube 19 and lower end 90 of second supply tube 77 form lip cleaner orifice 20. As in previous embodiments, lower ends 22 and 90 may also be on different horizontal planes as shown in FIG. 8, or lower end 22 may be on the same horizontal plane (flush) as lower end 90 as shown in FIG. 9. As shown in FIGS. 8 through 10, outer gas tube 19 preferably tapers and thereby reduces the size of annular space 21 at lower end 22.

Nanofibers are produced by using the apparatus of FIG. 8 by the following method. A first fiber-forming material is provided by a first material source 94, and fed through first annular space 69 and directed into first gas jet space 71. Pressurized gas is forced from a gas source through the center tube 11 and into first gas jet space 71. This gas should be forced through center tube 11 at a sufficiently high pressure so as to carry the fiber forming material along the wall of jet space 71 and create nanofibers, as mentioned in previous embodiments. A second fiber-forming material may be provided by the first material source (not shown) or by a second material source 96, and fed through second supply annular space 79. The second fiber-forming material is directed into second gas jet space 92. Pressurized gas is forced from a source through middle gas annular column 75 and into second gas jet space 92. This gas should be forced through middle gas annular column 75 at a sufficiently high pressure so as to carry the fiber forming material along the wall of jet space 92 and create nanofibers, as mentioned in previous embodiments. Therefore, in one embodiment, the gas is forced through center tube 11 and middle gas tube 73 under a pressure of from about 10 to about 5,000 psi, or even from about 50 to about 500 psi.

Pressurized gas is also forced through outer gas tube 19 and exits from outer gas tube 19 at lip cleaner orifice 20, thereby preventing the build up of residual amounts of fiber-forming material that can accumulate at lower end 90 of supply tube 77. The gas flow through lip cleaner orifice 20 also affects the exit angle of the strands of fiber-forming material exiting from exit orifice 87, and therefore lip cleaner 30 of this environment serves both to clean the lip and control the flow of exiting fiber strands. In a similar manner, the gas exiting second supply tube exit orifice 87 also serves to clean lower end 67 of first supply tube 61 and controls the flow of fiber strands exiting from first supply tube 61. In this way, each gas tube functions as a lip cleaner for the supply tube that is concentrically interior to such a respective supply tube.

The gas that is forced through gas annular column 21 should be at a sufficiently high pressure so as to prevent accumulation of excess fiber-forming material at lower end 90 of second supply tube 77, yet should not be so high that it disrupts the formation of fibers. Therefore, in one embodiment, the gas is forced through the gas annular column 21 under a pressure of from about 0 to about 1,000 psi, or even from about 10 to about 100 psi. The gas flow through lip cleaner orifice 20 also affects the exit angle of the strands of fiber-forming material exiting from outlet orifice 15, and therefore lip cleaner 30 of this environment serves both to clean the lip and control the flow of exiting fiber strands.

In similar embodiments, which are shown in FIGS. 9 and 10, a shroud gas tube 31 is positioned concentrically around outer gas tube 19. Pressurized gas at a controlled temperature is forced through shroud gas tube 31 so that it exits from the shroud gas tube orifice 32 and thereby creates a moving shroud of gas around the nanofibers. This shroud of gas can control the solidification rate of the fiber-forming material by, for example influencing the cooling rate of a molten fiber-forming material, the solvent evaporation rate of the fiber-forming material, or the rate of chemical reactions occurring within the fiber-forming material. It should be understood that the general shape of the gas shroud is controlled by the width of the annular tube orifice 32 and its vertical position with respect to lower end 22 of outer gas tube 19. The shape is further controlled by the pressure and volume of gas flowing through the shroud. It should be further understood that the gas flowing through the shroud is, in one instance, under a relatively low pressure and at a relatively high volume flow rate in comparison with the gases flowing through center tube 11 and middle gas tube 73.

In one embodiment, shroud gas tube orifice 32 is in an open configuration, as shown in FIG. 9. In another embodiment, as shown in FIG. 10, orifice 32 is in a constricted configuration, wherein the orifice is partially closed by a shroud partition 33 that may adjustably extend radially inward from shroud gas tube 31 toward lower end 23.

It should be understood that there are many conditions and parameters that will impact the formation of fibers, and specifically the fibers/nanofibers, according to the present invention. For example, the pressure of the gas moving through any of the columns of the apparatus of this invention may need to be manipulated based on the fiber-forming material that is employed. Also, the fiber/nanofiber-forming material being used or the desired characteristics of the resulting fiber/nanofiber may require that the fiber-forming material itself or the various gas streams be heated. For example, the length of the nanofibers can be adjusted by varying the temperature of the shroud air. Where the shroud air is cooler, thereby causing the strands of fiber-forming material to quickly freeze or solidify, longer nanofibers can be produced. On the other hand, where the shroud air is hotter, and thereby inhibits solidification of the strands of fiber-forming material, the resulting nanofibers will be shorter in length. It should also be appreciated that the temperature of the pressurized gas flowing through center tube 11 and middle gas tube 73 can likewise be manipulated to achieve or assist in these results.

Those skilled in the art will be able to heat the various gas flows using techniques that are conventional in the art. Likewise, the fiber/nanofiber-forming material can be heated by using techniques well known in the art. For example, heat may be applied to the fiber/nanofiber-forming material entering the supply tube, to the pressurized gas entering the center tube, or to the supply tube itself by a heat source 39, as shown in FIGS. 3 and 6, for example. In one particular embodiment, as shown in FIG. 6, heat source 39 can include coils that are heated by a source 59.

As would be appreciated upon reading and understanding the process of the present invention, after NGJ production of composite nanofibers is complete, such nanofibers are subjected to a heating step, as is described above, to yield flexible fibers/nanofibers in accordance with one or more embodiments of the present invention.

In another embodiment, NGJ can be combined with electrospinning techniques. In these combined process, NGJ improves the production rate while the electric field maintains the optimal tension in the jet to produce orientation and avoid the appearance of beads on the fibers/nanofibers. The electric field also provides a way to direct the nanofibers along a desired trajectory through processing machinery, heating ovens, or to a particular position on a collector/sheet. Electrical charge on the fiber/nanofiber can also produce looped and coiled nanofibers that can increase the bulk of the non-woven fabric made from these fibers/nanofibers.

The following specific examples are exemplary in nature, and the present invention is not limited thereto.

EXAMPLES

In the present examples, the HEFC utilized is Tecophilic®, an aliphatic polyether-based thermoplastic urethane that contributes both elastomeric and hydrophilic components to the fiber. Only four wetting agents are added to Tecophilic® solutions that also contain an absorbent compound. In the present examples the absorbent compound is a crosslinked sodium polyacrylate.

Initially, in all the examples detailed below, a Tecophilic® polymer is dissolved in ethanol with constant heating and stirring. Initially for a stock solution, the concentration is 22.8% by weight. The melt index of Tecophilic® polymer is 18. To prepare the solution for electrospinning, the absorbent is weighed in a vial, and ethanol is added thereto to suspend the particles. The Tecophilic® solution is then added to this suspension, and the two are mixed. Lastly, the wetting agent is added to the mixture. The exact amounts of each component are detailed below in Table 1 below. The resulting solutions are electrospun according to the conditions detailed in Table 2 below.

TABLE 1

| Wetting Agent | Weight of Tecophilic/Absorbent (A) Solution in Grams | Weight of Tecophilic (TP) Polymer only (A and TP less EtOH) (g) | Amount of Wetting Agent Added (0.1 wt. %, 10 wt. % for PEO) (mg) | Actual Percentage of Wetting Agent to Polymer (w/w) |
|---|---|---|---|---|
| Sample 1 (Tween ® 20) - 97% active content* | 9.8446 | 2.7171 | 2.963 (2.874 active content) | 0.106% |
| Sample 2 (Glycerol) - 86% active content* | 9.0606 | 2.4997 | 3.0767 (2.646 active content) | 0.106% |
| Sample 3 (Tegopren ® 6921) - 49% active content* | 9.7918 | 2.7025 | 5.737 (2.8 active content) | 0.104% |
| Sample 4 PEO (9.1% in EtOH) | 5.9150 | 1.6325 | 2042.4 (185.89 polymer) | 10.22% |

*Active content refers to amount of dry compound. The wetting agents are all in solution form, and all are dissolved in water unless otherwise noted. Tween ® is obtained from Oleon, while Tegopren ® is obtained from Degussa.

TABLE 2

| Wetting Agent | Cone Opening Diameter | Gap Distance | Humidity | Temperature (° C.) | Voltage Used (kV) |
|---|---|---|---|---|---|
| Sample 1 | 1 mm | 37 cm | 40% | 27.9 | 30 |
| Sample 2 | 1 mm | 37 cm | 40% | 27.9 | 30 |
| Sample 3 | 1 mm | 37 cm | 40% | 27.7 | 30 |
| Sample 4 | 1 mm | 37 cm | 40% | 26.3 | 30 |

Next, as is shown in Table 3, seven more examples are produced using the Tecophilic® polymer discussed above with an absorbent (crosslinked sodium polyacrylate) and varying amounts of Tegopren® (a wetting agent).

TABLE 3

| Concentration of Tegopren® (% by weight) | Amount of Tecophilic® solution 19% in ( EtOH) (g) | Amount of sodium polyacrylate (g) | Amount of EtOH (g) | Amount of Tegopren® (mg) |
|---|---|---|---|---|
| 0 | 6.9966 | 1.3378 | 5.2563 | 0 |
| 0.01 | 13.1428 | 2.5156 | 9.1880 | 0.5733 active content |
| 0.025 | 10.33 | 2.0066 | 7.3139 | 1 active content |
| 0.05 | 14.3546 | 2.7639 | 10.2995 | 2.744 active content |
| 0.075 | 6.1089 | 1.17 | 4.0114 | 1.77 active content |
| 0.1 | 57.9042 | 11.1616 | 37.1564 | 24.17 active content |
| 1.0 | 13.7685 | 2.55183 | 3.8754 | 56.27 active content |

Figure 11:
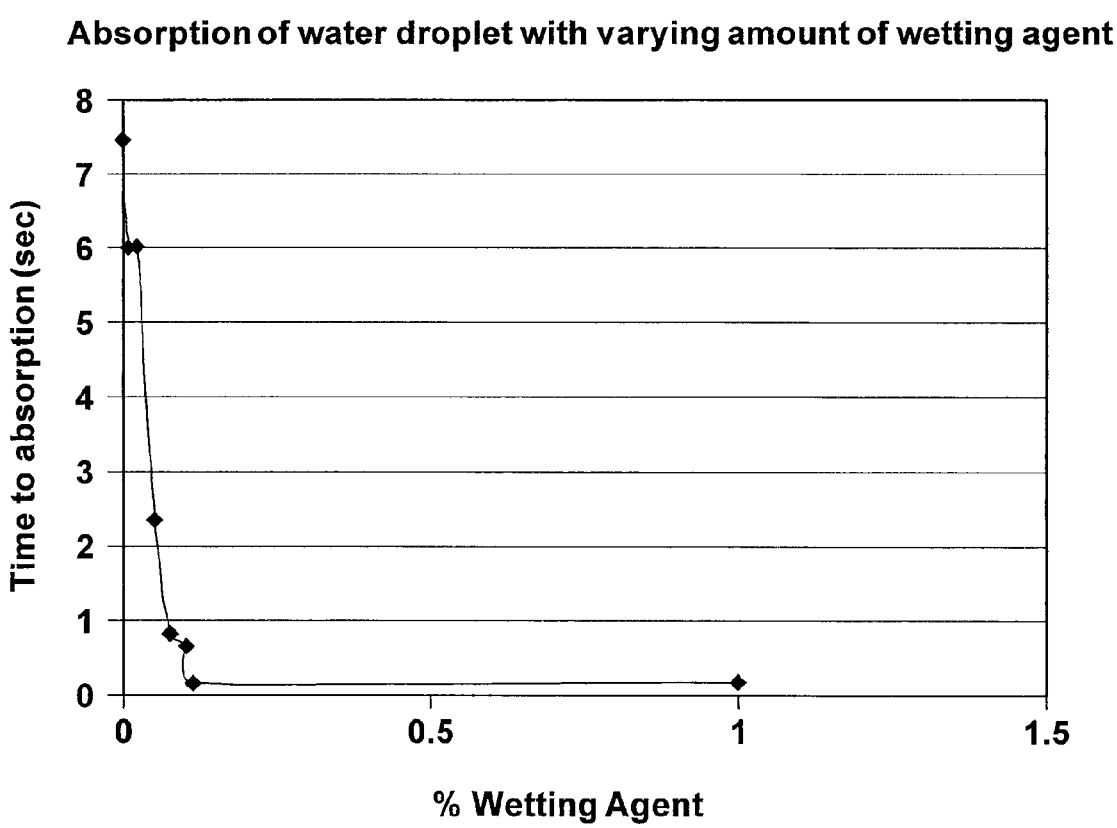
FIG. 11 is a plot of time to absorption versus weight percent of wetting agent for a non-woven fibrous mat in accordance with one embodiment of the present invention.
Figure 12:
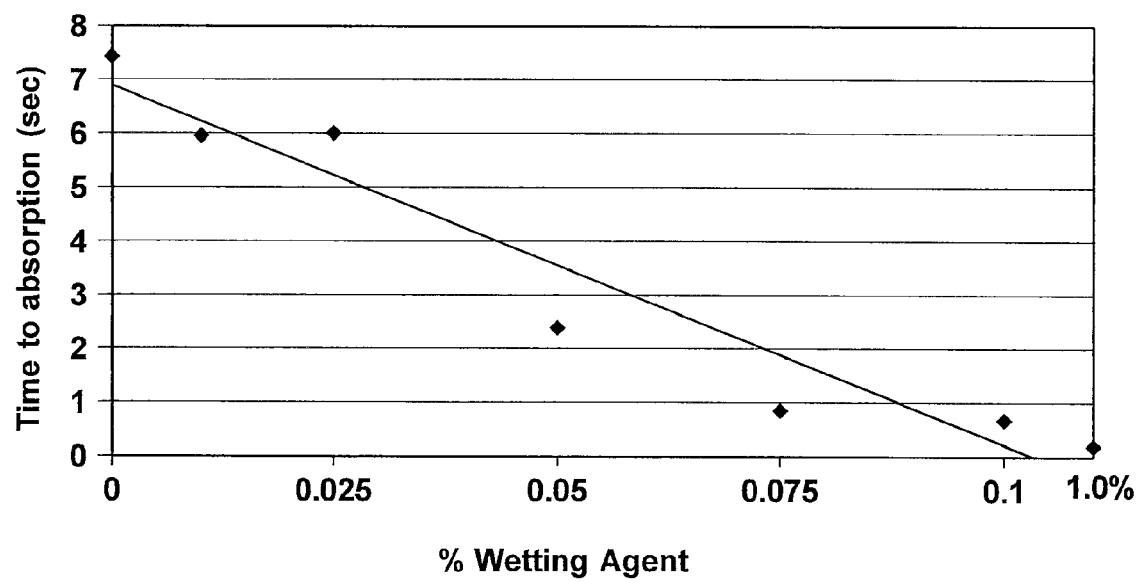
FIG. 12 is a computer-generated linear expression of the data of FIG. 11.

Table 4 below shows the average time needed to absorb a water droplet by the electrospun non-woven mats formed from the solutions of Table 3. FIG. 11 is a plot of the times of Table 4, while FIG. 12 is a computer-generated linear expression of the results contained in Table 4.

TABLE 4

| Concentration of Tegopren® (% by weight) | Average time to absorb water droplet (seconds) | Standard Deviation |
|---|---|---|
| 0 | 7.45 | 0.0681 |
| 0.01 | 5.96 | 0.4045 |
| 0.025 | 6.01 | 0.3958 |
| 0.05 | 2.37 | 0.4952 |
| 0.075 | 0.822 | 0.0508 |
| 0.1 | 0.725 | 0.0387 |
| 1.0 | 0.167 | 0.0 |

In the following Samples A to F, the non-woven polymer mat's fibers are formed from Tecophilic®, an aliphatic polyether-based thermoplastic urethane that contributes both elastomeric and hydrophilic components to the fibers, according to the method described above. The absorbent compound is a crosslinked sodium polyacrylate copolymer and is utilized at the concentrations noted in Table 5. The exact make-up of the solutions used to produce non-woven polymer mat Samples A to F are shown in Table 5 below.

TABLE 5

| Sample | Weight of Non-Woven (g/m²) | Sodium Polyacrylate Content (wt %) | Wetting Agent |
|---|---|---|---|
| A | 5 | 50 | — |
| B | 130 | 50 | — |
| C | 280 | 50 | — |
| D | 60 | 50 | Tegopren® (0.1 wt %) |
| E | 40 | 50 | Tween® 20 (0.1 wt %) |
| F | 40 | 50 | Glycerol (0.1 wt %) |

TABLE 6

Time in Seconds Needed for 0.9% NaCl Solution to Rise to the Below Listed Centimeter Marks on a Non-Woven Polymer Strip

| Sample | 1 cm | 2 cm | 3 cm | 4 cm | 5 cm |
|---|---|---|---|---|---|
| A | 30 | 68 | 114 | 170 | 240 |
| B | 100 | 140 | 270 | 450 | 560 |
| C | 37 | 90 | 186 | 360 | 600 |
| D | 2 | 13 | 40 | 90 | 180 |
| E | 10 | 23 | 36 | 60 | 120 |
| F | 22 | 55 | 80 | 120 | 160 |

Table 6 contains vertical wicking data for Sample A through F. The vertical wicking ability of Samples A through F is tested as follows. A ten by one centimeter strip of a non woven polymer mat formed in accordance with Samples A through F is marked in one centimeter increments. Each strip of non-woven polymer mat is dipped into 0.9 weight percent NaCl solution up to the one centimeter mark. The time it takes for the NaCl solution to rise an additional one, two, three, four and five centimeters above the one centimeter mark is noted (see Table 6). Any elongation in the non-woven polymer strips is compensated for by adjusting the surface of the NaCl solution versus the original dipping point of one centimeter.

As can be seen from the data of Table 6, the Samples that contain at least one wetting agent (e.g., a surfactant) wick the NaCl solution much more quickly than those Samples that contain no wetting agent.

Figure 13:
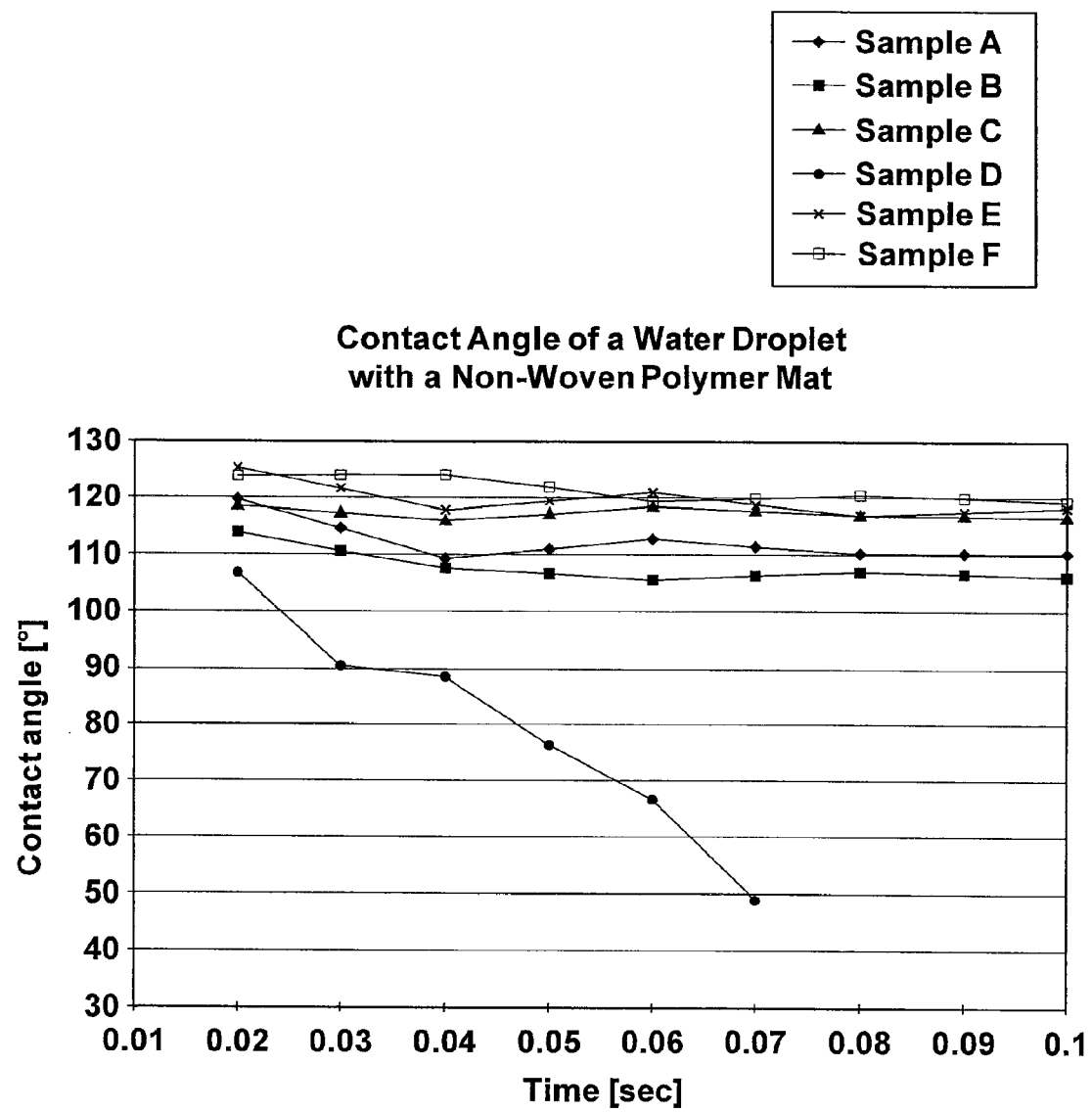
FIG. 13 is a graph illustrating the contact angle of a water droplet versus elapsed time on the surface of various non-woven polymer mats.
Figure 14:
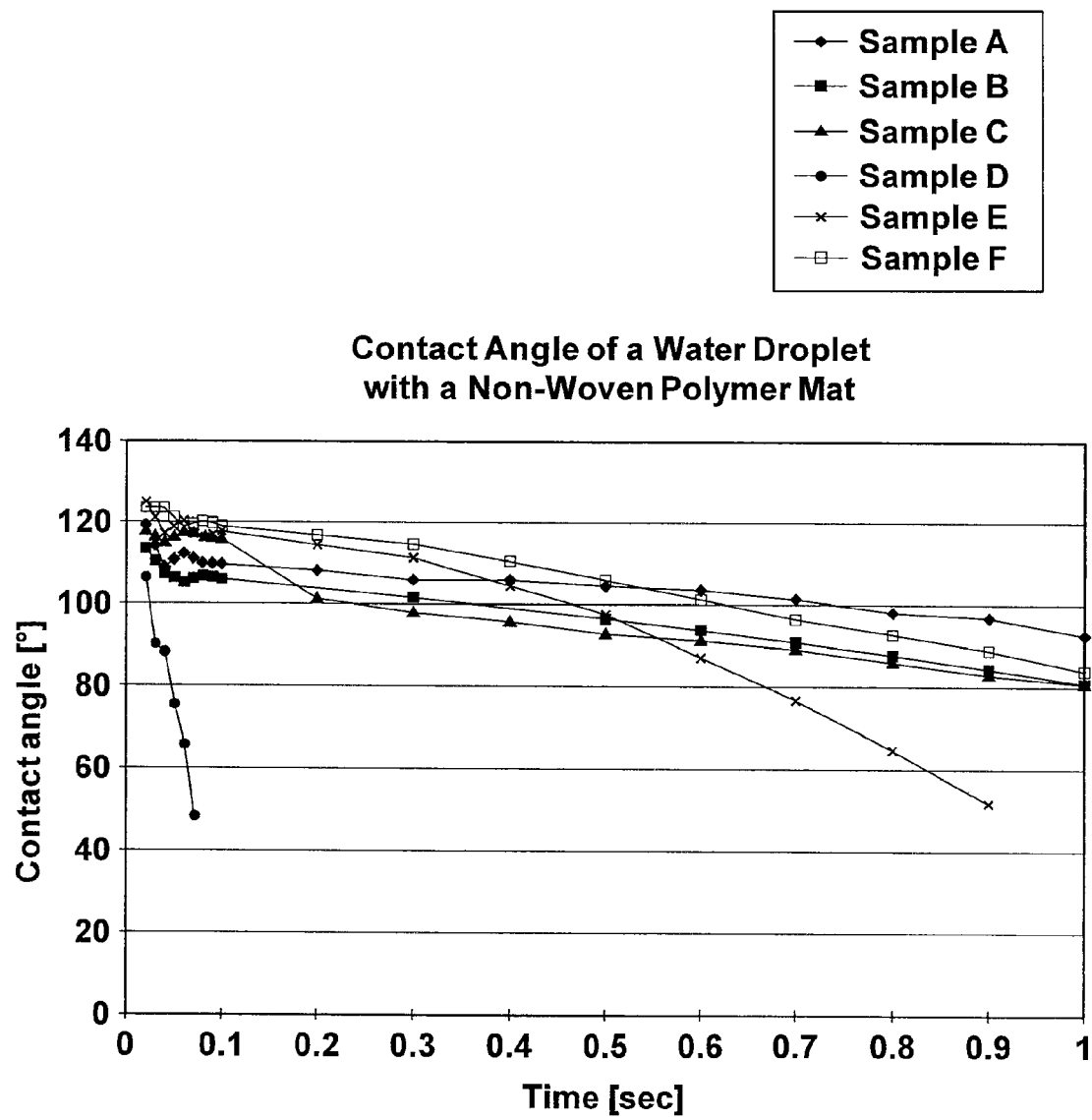
FIG. 14 is a graph illustrating the contact angle of a water droplet versus a longer period of elapsed time on the surface of the non-woven polymer mats of FIG. 13.
Figure 15:
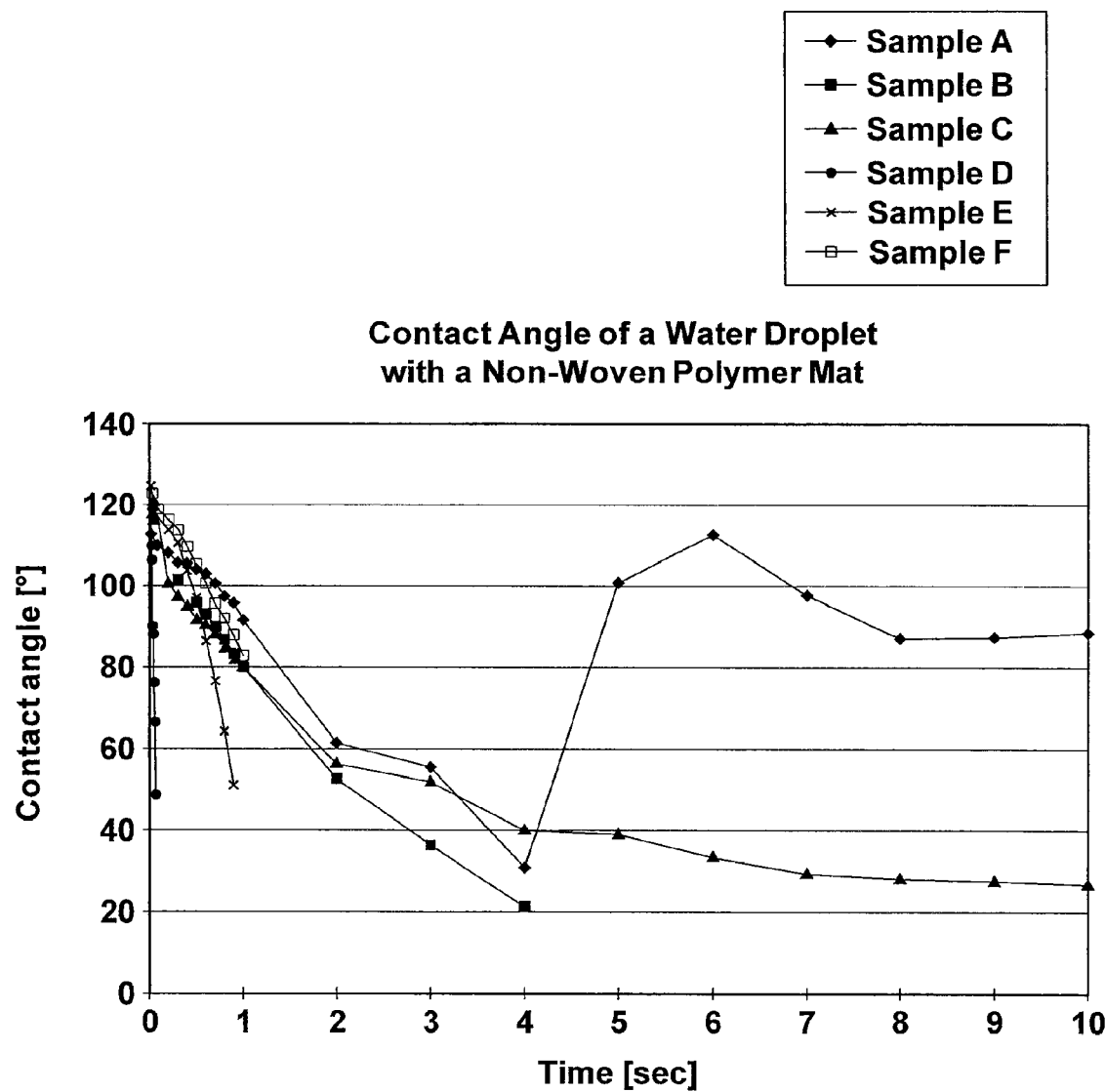
FIG. 15 is a graph illustrating the contact angle of a water droplet over an even longer period of elapsed time on the surface of the non-woven polymer mats of FIG. 13.

FIGS. 13 through 15 illustrate the contact angle of a water droplet versus elapsed time on the surface of non-woven polymers mats formed in accordance with Examples A through F as detailed in Table 5. In the case of Samples D, E and F, the wetting agent contained in these samples is added to the polymer/absorbent solution that is used in the electrospinning process to form non-woven polymer mats in accordance with the present invention. As can be seen from the data contained in FIG. 13 through 15, the inclusion of a wetting agent causes the contact angle of a water droplet to decrease much more quickly over a given period of time. As would be appreciated by those of skill in the art, the contact angle of a water droplet over time is one method by which to judge the absorption ability of a non-woven polymer mat. It should also be noted that the plots contained in FIGS. 13 and 14 are just close up portions of the overall data contained in FIG. 15.

Figure 16:
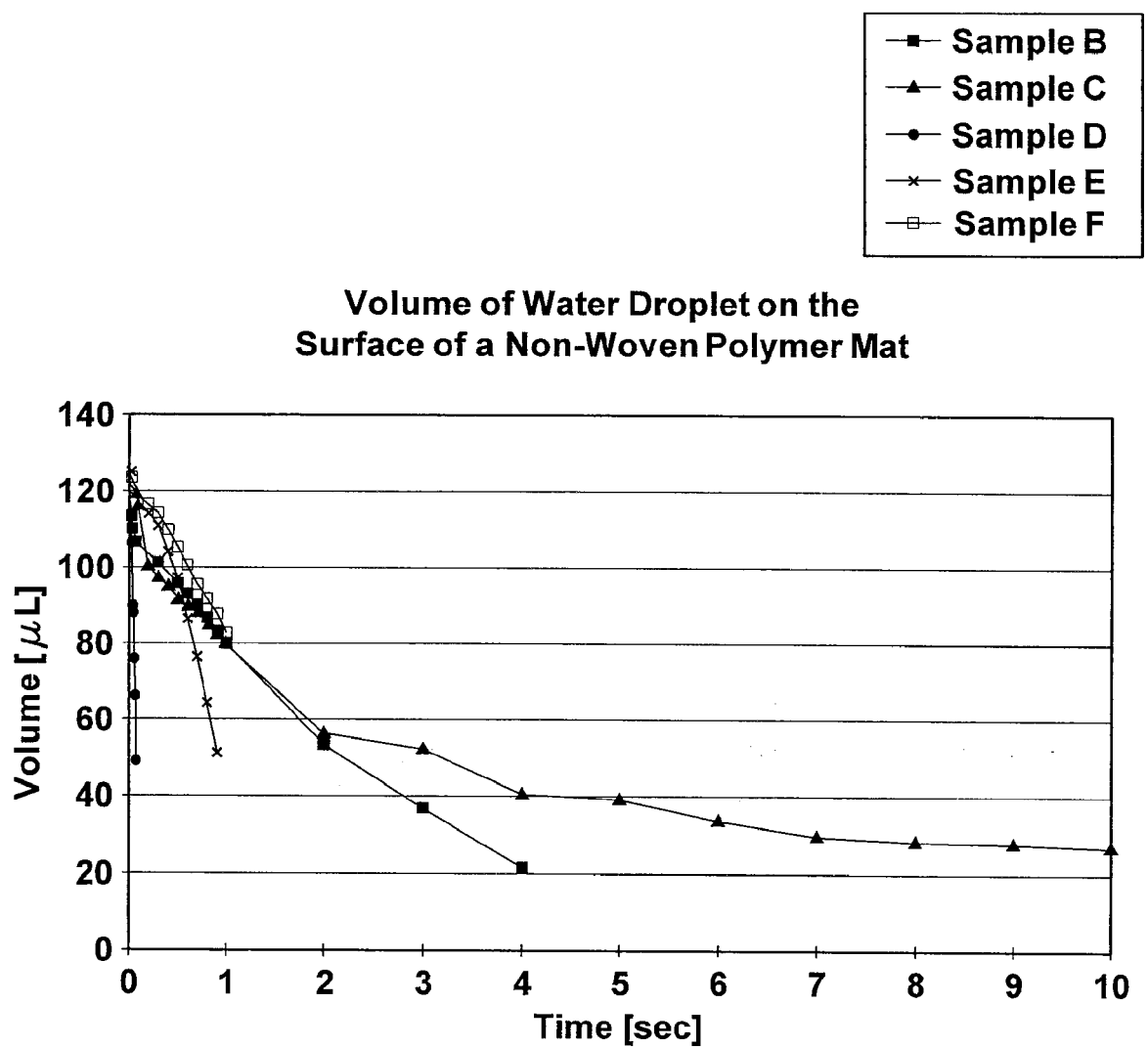
FIG. 16 is a graph illustrating the volume of a water droplet over time on the surface of the non-woven polymer mats of FIG. 13.

Turning to FIG. 16, FIG. 16 is a graph illustrating the volume of a water droplet versus elapsed time where the water droplet is placed on the surface of a non-woven polymer mat formed in accordance with Samples B through F as detailed in Table 5. As can be seen from the data contained in FIG. 16, Samples D, E and F absorb the water droplet much more quickly than Samples B and C. As would be appreciated by those of skill in the art, a reduction in the time that it takes a non-woven polymer mat to absorb a water could be desirable in a number of applications including, but not limited to, wound dressing, tampons, diapers, and/or incontinence pads.

Figure 17:
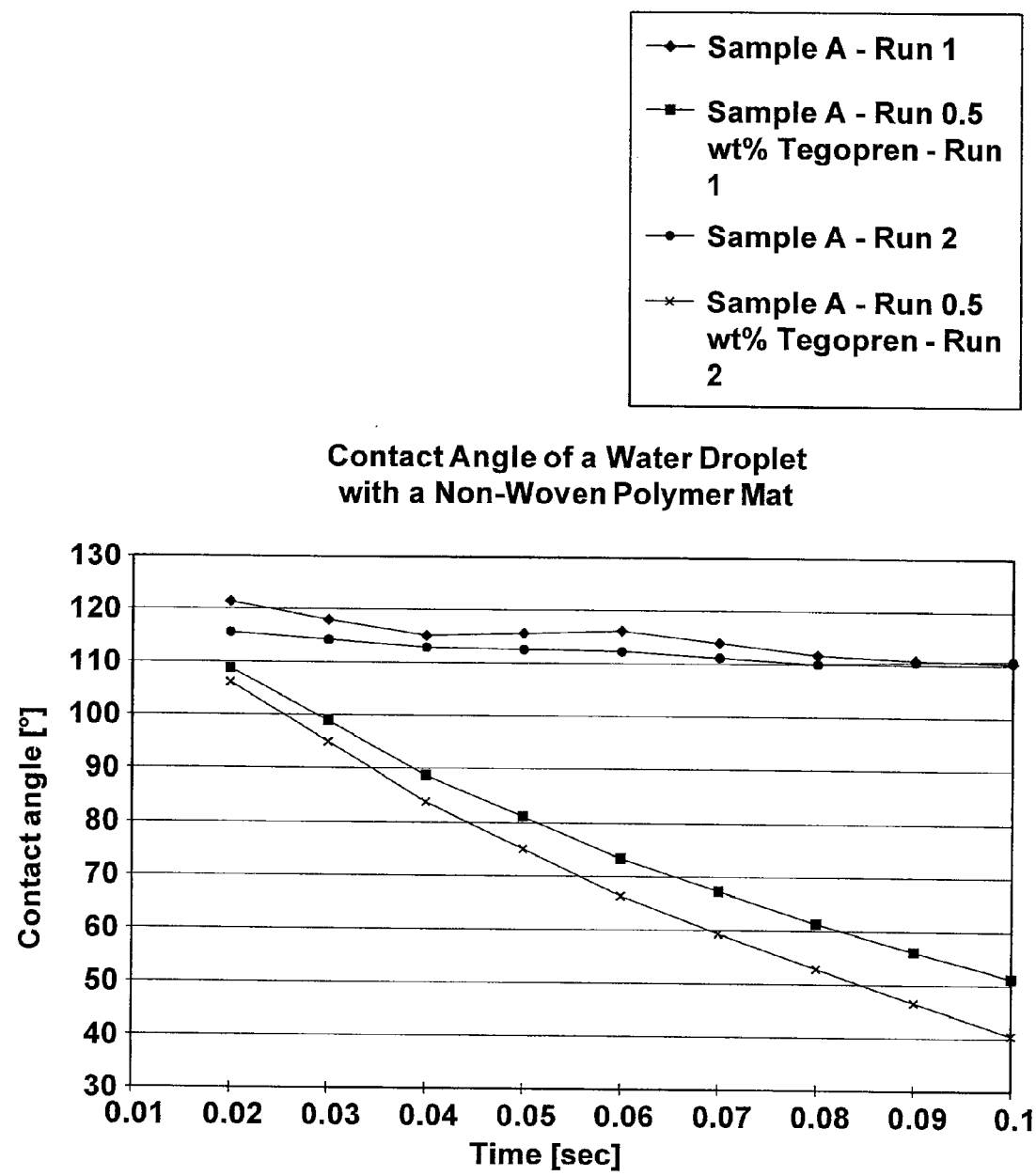
FIG. 17 is a graph illustrating the contact angle of a water droplet versus elapsed time on two prior art non-woven polymer mats and two non-woven polymer mats formed in accordance with one embodiment of the present invention.

FIG. 17 illustrates the contact angle of a water droplet versus elapsed time where the water droplet is placed on a non-woven pad in accordance with Sample A (2 data runs) and Sample A plus a sprayed on wetting agent (in this case a surfactant—Tegopren®, also 2 data runs). The amount of Tegopren® used in the two samples of FIG. 17 is 0.5 weight percent. As noted above, the contact angle of a water droplet over time is one method by which to judge the absorption ability of a non-woven polymer mat. Thus, even the inclusion of a wetting agent by spraying the wetting agent on a previously formed non-woven polymer mat improves the absorption ability of a non-woven polymer mat.

As noted above, the present invention is not solely limited to embodiments where one or more wetting agents are sprayed on a non-woven polymer mat formed in accordance with the present invention. Instead, the present invention also covers the embodiment where one or more wetting agents are added to the fiber forming solutions that are used to produce non-woven polymer mats. In some instances it is desirable to place one or more wetting agents in the fiber forming solution since spraying one or more wetting agents onto the surface of a previously formed non-woven polymer mat yields a final product having wetting agent present both on the surface of and in-between the fibers of the non-woven polymer mat. The existence of one or more wetting agents between the fiber surfaces of a non-woven polymer mat may lead to bleed out of the one or more wetting agents from the polymer mat. This in turn can lead to the one or more wetting agents coming into contact with the skin, or other sensitive surface, of a user/wearer. Such contact can, among other things, cause allergic reactions in the user/wearer.

In another instance, the inclusion of too much wetting agent can/may cause too great a reduction in the surface tension of water, or some other liquid. This large reduction in surface tension could cause the water or other liquid to run off the surface of a non-woven polymer mat rather than being absorbed by it.

One solution to the above issues is to include the one or more wetting agents in the fiber forming solution used to produce a non-woven polymer mat in accordance with the present invention. In another embodiment, the non-woven polymer mats of the present invention can also include one or more additional additives. Such additional additives include, but are not limited to, fragrances, odor suppressors, anti-bacterial compounds enzymes or enzymatic compounds, and/or anti-viral compounds. These additional additives can be sprayed on the non-woven polymer mats of the present invention after production thereof, or can included in the fiber forming solution used to produce the non-woven polymer mats of the present invention.

In still another embodiment, the non-woven polymer mats of the present invention can comprise two or more layers of different fibers. Mats according to this embodiment can be formed by, for example, electrospinning a second type of fibers on a previously electrospun first type of fibers. In this embodiment, at least one set of fibers has therein one or more wetting agents. Each fiber layer can also independently include one or more of the additional additives discussed above.

In one specific instance, a non-woven polymer mat in accordance with the present invention has at least two layers of different fibers, with only one layer containing one or more wetting agents.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A liquid entrapping device comprising: at least one hydrophilic elastomeric fibrous component; and at least one wetting agent component,
   wherein the at least one hydrophilic elastomeric fibrous component and the at least one wetting agent component are in physical proximity resulting in fluid communication and the existence of the at least one wetting agent increases the absorption speed and absorption ability of liquid by the liquid entrapping device compared to an otherwise identical liquid entrapping device that does not contain the at least one wetting agent;
   wherein the at least one wetting agent is i) coated on the surface of the at least one hydrophilic elastomeric fibrous component, ii) physisorbed or chemisorbed on the surface of the at least one hydrophilic elastomeric fibrous component or iii) embedded in the at least one hydrophilic elastomeric fibrous component;
   wherein a liquid is entrapped by being absorbed by the liquid entrapping device, and the at least one hydrophilic elastomeric fibrous component absorbs and wicks the liquid.

2. The liquid entrapping device of claim 1, wherein the at least one hydrophilic elastomeric fibrous component is selected from at least one electrospun hydrophilic elastomeric fibrous component, at least one nanofiber by gas jet hydrophilic elastomeric fibrous component, or a combination thereof.

3. The liquid entrapping device of claim 2, wherein the at least one hydrophilic elastomeric fibrous component is selected from one or more zein proteins, polyester elastomers, polydimethylsiloxane, hydrophilic poly(ether-co-ester) elastomers, silicone-co-rx) lycthylcncglycol elastomers, thermoplastic silicone elastomers, polyacrylates, thermoplastic polyurethanes, poly(etha-co-urethancs), or combinations of two or more thereof.

4. The liquid entrapping device of claim 2, wherein the at least one hydrophilic elastomeric fibrous component is selected from one or more polyurethanes, poly ether-co-urethanes, or combinations of two or more thereof.

5. The liquid entrapping device of claim 1, wherein at least one wetting agent is selected from one or more soaps, alcohols, fatty acids, surfactants, glycerols, sugars, polysaccharides, and low molecular weight polymers, or mixtures of two or more thereof.

6. The liquid entrapping device of claim 1, wherein the at least one wetting agent is selected from one or more non-ionic, anionic, cationic compounds, or mixtures of two or more thereof.

7. The liquid entrapping device of claim 1, wherein me at least one wetting agent is selected from polyoxyethylene sorbitan monolaurate, glycerol, iorric silicone surfactants, quaternary polydimethyl siloxanes, or a combination of two or more thereof.

8. The liquid entrapping device of claim 1, wherein the at least one wetting agent is a diquaternary polydimethyl siloxane.

9. The liquid entrapping device of claim 1, wherein the at least one wetting agent is present in an amount from about 0.01 weight percent to about 1 weight percent based.

10. The liquid entrapping device of claim 9, wherein the at least one wetting agent is present in an amount from about 0.025 weight percent to about 0.5 weight percent.

11. The liquid entrapping device of claim 9, wherein the at least one wetting agent is present in an amount from about 0.05 weight percent to about 0.025 weight percent.

12. The liquid entrapping device of claim 9, wherein the at least one wetting agent is present in an amount from about 0.075 weight percent to about 0.1 weight percent.

13. The liquid entrapping device of claim 1, further comprising:
   at least one absorbent component, wherein the absorbent component and the at least one hydrophilic elastomeric fibrous component are in physical proximity resulting in fluid communication, and wherein the at least one hydrophilic elastomeric fibrous component absorbs more quickly but has a smaller holding capacity than the at least one absorbent component.

* * * * *